(12) United States Patent
Arbel

(10) Patent No.: US 6,282,631 B1
(45) Date of Patent: Aug. 28, 2001

(54) PROGRAMMABLE RISC-DSP ARCHITECTURE

(75) Inventor: Ygal Arbel, Belmont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/220,158

(22) Filed: Dec. 23, 1998

(51) Int. Cl.[7] .................................................. G06F 15/00
(52) U.S. Cl. ............................... 712/35; 712/26; 712/33
(58) Field of Search ............................ 712/35, 36, 33, 712/200, 32, 41, 248, 208, 217, 9, 203; 710/100; 345/302; 711/147; 704/270

(56) References Cited

U.S. PATENT DOCUMENTS

| | | | |
|---|---|---|---|
| 5,448,735 | 9/1995 | Anderson et al. | 395/650 |
| 5,467,131 | 11/1995 | Bhaskaran et al. | 348/384 |
| 5,708,659 | 1/1998 | Rostoker et al. | 370/392 |
| 5,710,914 * | 1/1998 | Verbauwhede et al. | 712/245 |
| 5,719,998 | 2/1998 | Ku et al. | 395/2.91 |
| 5,732,224 * | 3/1998 | Gulick et al. | 710/100 |
| 5,754,878 * | 5/1998 | Asghar et al. | 712/35 |
| 6,012,137 * | 1/2000 | Bublil et al. | 712/36 |
| 6,044,206 * | 3/2000 | Kohn | 709/248 |
| 6,055,619 * | 4/2000 | North et al. | 712/36 |
| 6,092,179 * | 7/2000 | Greenberger et al. | 712/35 |

OTHER PUBLICATIONS

Linley Gwennap, "New PA–RISC Processor Decodes MPEG Video—HP's PA–7100LC Uses New Instructions to Elimiate Decoder Chip," Microprocessor Report, Jan. 24, 1994, pp. 16–17.

Linda Geppert, "High–flying DSP architectures," IEEE Spectrum, Nov. 1998, pp. 53–56.

\* cited by examiner

Primary Examiner—Larry D. Donaghue
(74) Attorney, Agent, or Firm—Skjerven Morrill MacPherson LLP.; Edward C. Kwok; Fabio E. Marino

(57) ABSTRACT

The present invention provides an audio signal processor and method of operation thereof that enables efficient digital signal processing. Fast multiply-accumulate (MAC) and vector processing capabilities are implemented in a RISC architecture giving the high speed capabilities of a digital signal processing system the speed and efficiency of a RISC processor.

12 Claims, 18 Drawing Sheets

Fig. 5A

| b31 | | | | b20 | b19 | | | | b10 | b9 | | | | b1 | b0 |
|---|---|---|---|---|---|---|---|---|---|---|---|---|---|---|---|
| | | | | | \multicolumn{5}{c|}{OP_MODE} | \multicolumn{6}{c|}{CMD_ID = 0x2A?} |
| | | | | | \multicolumn{5}{c|}{reserved} | \multicolumn{6}{c|}{HOST_CMD = *Idle/Noop*} |
| | | | | | \multicolumn{11}{c|}{reserved} |
| | | | | | \multicolumn{11}{c|}{reserved} |
| | | | | | \multicolumn{11}{c|}{reserved} |
| | | | | | \multicolumn{11}{c|}{reserved} |
| | | | | | \multicolumn{11}{c|}{reserved} |
| | | | | | \multicolumn{11}{c|}{reserved} |

Fig. 5B

| b31 | | | | b20 | b19 | | | | b10 | b9 | | | | b1 b0 |
|---|---|---|---|---|---|---|---|---|---|---|---|---|---|---|
| | | | | | OP_MODE | | | | | CMD_ID = 0x2A? | | | | |
| | | | | | CMD_PARAMS | | | | | HOST_CMD = *Decode* | | | | |
| | | | | | SAMP_CNT | | | | | FRM_CNT | | | | |
| | | | | | INBUF_THRESHOLD | | | | | CMD_MODE | | | | |
| | | | | | VOLUME_LEVEL | | | | | | | | | |
| | | | | | STATUS_SELECT | | | | | | | | | |
| | | | | | DNMIX_MAT_PTR | | | | | | | | | |
| | | | | | reserved | | | | | | | | | |

Fig. 5C

| b31 | | | | b20 | b19 | | | | b10 | b9 | | | | b1 b0 |
|---|---|---|---|---|---|---|---|---|---|---|---|---|---|---|
| | | | | | OP_MODE | | | | | CMD_ID = 0x2A? | | | | |
| | | | | | CMD_PARAMS | | | | | HOST_CMD = *Skip* | | | | |
| | | | | | must be 0 | | | | | FRM_CNT | | | | |
| | | | | | INBUF_THRESHOLD | | | | | CMD_MODE | | | | |
| | | | | | VOLUME_LEVEL | | | | | | | | | |
| | | | | | STATUS_SELECT | | | | | | | | | |
| | | | | | DNMIX_MAT_PTR | | | | | | | | | |
| | | | | | reserved | | | | | | | | | |

Fig. 5D

| b31 | | | | b20 | b19 | | | b10 | b9 | | | b1 b0 |
|---|---|---|---|---|---|---|---|---|---|---|---|---|
| | | | | | OP_MODE | | | | CMD_ID = 0x2A? | | | |
| | | | | | CMD_PARAMS | | | | HOST_CMD = Output | | | |
| | | | | | SAMP_CNT | | | | FRM_CNT | | | |
| | | | | | SILENCE | | | | CMD_MODE | | | |
| | | | | | VOLUME_LEVEL | | | | | | | |
| | | | | | STATUS_SELECT | | | | | | | |
| | | | | | DNMIX_MAT_PTR | | | | | | | |
| | | | | | reserved | | | | | | | |

Fig. 5E

| b31 | | | | b20 | b19 | | | b10 | b9 | | | b1 b0 |
|---|---|---|---|---|---|---|---|---|---|---|---|---|
| | | | | | OP_MODE | | | | CMD_ID = 0x2A? | | | |
| | | | | | CMD_PARAMS | | | | HOST_CMD = Soft Reset | | | |
| | | | | | MSG_BUF_PTR | | | | | | | |
| | | | | | MSG_BUF_SIZE | | | | | | | |
| | | | | | WORK_BUF_PTR | | | | | | | |
| | | | | | WORK_BUF_SIZE | | | | | | | |
| | | | | | CBS_BUF_PTR | | | | | | | |
| | | | | | CBS_BUF_SIZE | | | | | | | |

Fig. 5F

| b31 | | | | b20 | b19 | | | b10 | b9 | | | b1 b0 |
|---|---|---|---|---|---|---|---|---|---|---|---|---|
| | | | | | OP_MODE | | | | CMD_ID = 0x2A? | | | |
| | | | | | PARAM_COUNT | | | | HOST_CMD = LoadS | | | |
| | | | | | 1st Parameter Index | | | | | | | |
| | | | | | 1st Parameter Value | | | | | | | |
| | | | | | 2nd Parameter Index | | | | | | | |
| | | | | | 2nd Parameter Value | | | | | | | |
| | | | | | 3rd Parameter Index | | | | | | | |
| | | | | | 3rd Parameter Value | | | | | | | |

Fig. 5G

| b31 | | | | b20 | b19 | | | b10 | b9 | | | b1 b0 |
|---|---|---|---|---|---|---|---|---|---|---|---|---|
| | | | | | \multicolumn{4}{c|}{OP_MODE} | \multicolumn{4}{c|}{CMD_ID = 0x2A?} |

| b31 | b20 | b19 | b10 | b9 | b1 b0 |
|---|---|---|---|---|---|
| | | OP_MODE | | CMD_ID = 0x2A? | |
| | | CMD_PARAMS | | HOST_CMD = LoadP | |
| | | PAR1 | | DECODER_SEL | |
| | | PAR3 | | PAR2 | |
| | | PAR5 | | PAR4 | |
| | | PAR7 | | PAR6 | |
| | | TBD | | | |
| | | PACK_EXT_PTR | | | |

Fig. 5H

| b31 | b20 | b19 | b10 | b9 | b1 b0 |
|---|---|---|---|---|---|
| | | OP_MODE | | CMD_ID = 0x2A? | |
| | | reserved | | HOST_CMD = Dump | |
| | | DEST_ADDR_PTR | | | |
| | | reserved | | | |
| | | reserved | | | |
| | | reserved | | | |
| | | reserved | | | |
| | | reserved | | | |

Fig. 6A

| b31 | | | | b20 | b19 | | | | b10 | b9 | | | | b1 b0 |
|---|---|---|---|---|---|---|---|---|---|---|---|---|---|---|
| | | | | | HOST_CMD | | | | | RET_CODE | | | | |
| | | | | | INBUF_LEVEL | | | | | CMD_ID | | | | |
| | | | | | reserved | | | | | reserved | | | | |
| | | | | | OUTBUF_WR_PTR | | | | | | | | | |
| | | | | | INBUF_RD_PTR | | | | | | | | | |
| | | | | | FRM_NUMBER | | | | | | | | | |
| | | | | | STATUS | | | | | | | | | |
| | | | | | MSG_TYPE = 1 | | | | | MSG_ID = 0x100 - 0x1FF | | | | |

Fig. 6B

| b31 | | | | b20 | b19 | | | | b10 | b9 | | | | b1 b0 |
|---|---|---|---|---|---|---|---|---|---|---|---|---|---|---|
| | | | | | reserved | | | | | RET_CODE | | | | |
| | | | | | INBUF_LEVEL | | | | | reserved | | | | |
| | | | | | reserved | | | | | reserved | | | | |
| | | | | | OUTBUF_WR_PTR | | | | | | | | | |
| | | | | | INBUF_RD_PTR | | | | | | | | | |
| | | | | | FRM_NUMBER | | | | | | | | | |
| | | | | | STATUS | | | | | | | | | |
| | | | | | MSG_TYPE = 2 | | | | | MSG_ID = 0x100 - 0x1FF | | | | |

Fig. 6C

| b31 | | | | b20 | b19 | | | | b10 | b9 | | | | b1 b0 |
|---|---|---|---|---|---|---|---|---|---|---|---|---|---|---|
| | | | | | SAMPRATE | | | | | NCHANS | | | | |
| | | | | | INBUF_LEVEL | | | | | LAYER | | | | |
| | | | | | FRM_SIZE | | | | | BITRATE | | | | |
| | | | | | OUTBUF_WR_PTR | | | | | | | | | |
| | | | | | INBUF_RD_PTR | | | | | | | | | |
| | | | | | FRM_NUMBER | | | | | | | | | |
| | | | | | STATUS | | | | | | | | | |
| | | | | | MSG_TYPE = 3 | | | | | MSG_ID = 0x100 - 0x1FF | | | | |

Fig. 6D

| b31 | | | | b20 | b19 | | | | b10 | b9 | | | | b1 b0 |
|---|---|---|---|---|---|---|---|---|---|---|---|---|---|---|
| | | | | | HOST_CMD | | | | | FW_REV_ID | | | | |
| | | | | | INBUF_LEVEL | | | | | CMD_ID | | | | |
| | | | | | reserved | | | | | reserved | | | | |
| | | | | | OUTBUF_WR_PTR | | | | | | | | | |
| | | | | | INBUF_RD_PTR | | | | | | | | | |
| | | | | | FRM_NUMBER | | | | | | | | | |
| | | | | | STATUS | | | | | | | | | |
| | | | | | MSG_TYPE = 4 | | | | | MSG_ID = 0x100 - 0x1FF | | | | |

$$\begin{bmatrix} C_{00} & C_{01} & C_{02} \\ C_{10} & C_{11} & C_{12} \\ C_{20} & C_{21} & C_{22} \\ C_{30} & C_{31} & C_{32} \\ C_{40} & C_{41} & C_{42} \end{bmatrix} * \begin{bmatrix} I_0 \\ I_1 \\ I_2 \end{bmatrix} = \begin{bmatrix} O_0 \\ O_1 \\ O_2 \\ O_3 \\ O_4 \end{bmatrix}$$

$$\begin{bmatrix} C_{00} & 0 & C_{02} & C_{03} & 0 \\ C_{10} & 0 & C_{12} & C_{13} & 0 \\ C_{20} & 0 & C_{22} & C_{23} & 0 \\ C_{30} & 0 & C_{32} & C_{33} & 0 \\ C_{40} & 0 & C_{42} & C_{43} & 0 \end{bmatrix} * \begin{bmatrix} I_0 \\ 0 \\ I_1 \\ I_2 \\ 0 \end{bmatrix} = \begin{bmatrix} O_0 \\ O_1 \\ O_2 \\ O_3 \\ O_4 \end{bmatrix}$$

Fig. 10

PROGRAMMABLE RISC-DSP ARCHITECTURE

BACKGROUND OF THE INVENTION

1. Field of the Invention

The invention relates generally to digital signal processors and, particularly, to an architecture for digital audio signal decoders.

2. Related Art

Audio decoders used to decode encoded audio datastreams are well known. Multimedia data encoded according to a format such as MPEG-1 or MPEG-2 includes both compressed audio and video streams. Audio/video digital signal processors are used to extract separate audio and video streams from the encoded multimedia stream. Audio and video decoder components of digital signal processors then decode the extracted streams. Finally, separate audio and video processors drive audio and video output devices.

As a result, audio decoders are typically designed to handle digital signal processing (DSP) vector functions such as filtering, convolution, and transformations efficiently. In particular, DSPs typically provide special purpose hardware to perform multiply-accumulate (MAC) instructions very quickly. However, due to their special purpose architecture, such audio decoders do not perform general purpose operations such as data manipulation, conversion, and table lookup as efficiently as general purpose processors. This is because general purpose processing is typically performed by a host processor, while the audio decoder is dedicated exclusively to DSP operations.

RISC processors, on the other hand, are typically designed to handle general processing functions efficiently. This is accomplished by providing large register files or sets within the processor to allow for fast execution (e.g. one instruction per clock cycle throughput) of arithmetic operations on the data stored in the register sets. However, typical RISC processors require data stored in memory to be first loaded into the register file before executing arithmetic operations on the data. This is true even of recently developed audio decoders based on RISC architectures.

As a result, there is a need for an audio decoder capable of performing both digital signal processing and general purpose operations efficiently.

SUMMARY OF THE INVENTION

The present invention provides an audio signal processor and method of operation thereof that allows for both efficient digital signal processing and general purpose operations. This is accomplished by adding support for fast MAC (vector) operations and indirect memory addressing to a RISC-based processor to allow for efficient execution of general purpose operations such as data manipulation, conversion, and table lookup, as well as digital processing operations such as filtering, convolution, and transformation. The RISC feature of large register files is preserved, as is RISC's one instruction per cycle pipelined throughput speed.

BRIEF DESCRIPTION OF THE DRAWINGS

The present invention may be better understood, and its numerous objects, features, and advantages made apparent to those skilled in the art, by referencing the accompanying drawings.

FIGS. 5A through 5H show one embodiment of the command formats used to control the present invention.

FIGS. 6A through 6D show one embodiment of the message formats used by the present invention.

FIG. 10 is an example of the external downmix matrix (EDM) capability of the present invention.

DETAILED DESCRIPTION

Introduction

The present invention is an efficient RISC-DSP audio decoder and a method of operating such a decoder, that performs both DSP and general purpose processing operations. The efficiency is accomplished by optimizing the RISC-DSP audio decoder to execute audio decompression algorithms such as MPEG-1, MPEG-2, and Dolby AC-3. The decoder's RISC heritage allows efficient execution of control and general processing operations such as bitstream parsing, data manipulation, conversions, and data lookup. The decoder's DSP heritage allows efficient execution of typical signal processing operations such as filtering, convolution, and transforms.

The RISC-DSP audio decoder supports the MPEG-1, MPEG-2, AC-3, PCM, and DTS audio coding formats. In particular, the RISC-DSP audio decoder decodes and decompresses input audio data into 16-bit (or 20 bit) PCM samples and writes the samples to an audio output buffer. The decoder further provides industry-standard MPEG, AC-3, and PCM decoders and MPEG, AC-3, PCM, and DTS SPDIF packers. Control of the RISC-DSP audio decoder by its host processor is generalized, such that the same control mechanism is used for all of the above decoders.

Each decoder processes data at two granularity levels: frame level and block level. Frame and block sizes, which are relative to the output buffer size, vary from decoder to decoder, and are summarized in Table 1.

TABLE 1

| TYPE | FRAME | BLOCK |
| --- | --- | --- |
| MPEG Layer 1 | 384 samples per channel | 32 samples per channel |
| MPEG Layer 2 | 1152 samples per channel | 32 samples per channel |
| AC-3 | 1536 samples per channel | 256 samples per channel |
| PCM, PCM-SPDIF at 48 KHz | 80 samples per channel | 80 samples per channel |
| PCM at 96 KHz | 160 samples per channel | 160 samples per channel |
| AC-3 SPDIF | 12,288 bytes (A frame is 1536 IEC-958 frames, representing 32 msec of time, and containing a single AC-3 frame of compressed data.) | 1536 bytes (A block is 192 IEC-958 frames, which is the smallest repeatable unit of the SPDIF format.) |
| MPEG SPDIF Layer 1 | 3,072 bytes | 1536 bytes |
| Layer 2 | 9,216 bytes | 1536 bytes |
| DTS SPDIF | TBD | TBD |

The decoder supports the following audio output buffer data formats:

- 2 channels—Stereo Output. Sample interleaving order: L, R. If the input material is mono, the data is duplicated and output as stereo.
- 6 channels—Surround Output. Sample interleaving order: L, C, R, Ls, Rs, Lfe.
- 8 channels—Surround and Stereo downmix. Sample interleaving order: L, C, R, Ls, Rs, Lfe, Ld, Rd.

where the terms L, C, R, Ls, Rs, Lfe, Ld, Rd represent the Left, Center, Right, Left Surround, Right Surround, Low-Frequency Effects, Left Downmix, and Right Downmix audio channels respectively.

Figure 1:
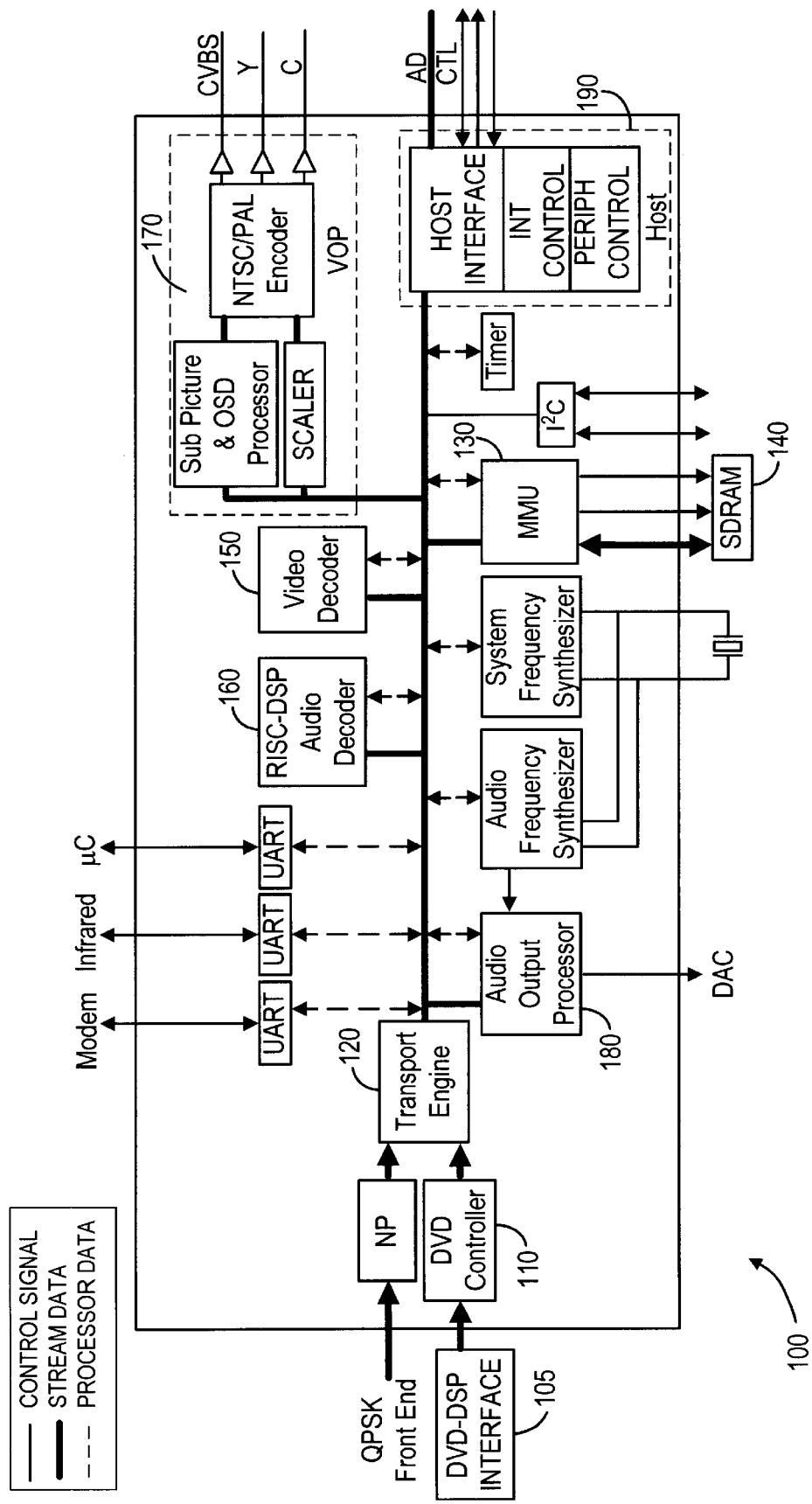
FIG. 1 is a block diagram of a multimedia processor including a RISC-based digital signal processor for audio decoding, according to an embodiment of the invention.

FIG. 1 is a block diagram of a DVD decoder 100 including a RISC-DSP audio decoder 160, in accordance with an embodiment of the invention. DVD decoder 100 has several components including DVD-DSP interface 105, DVD controller 110, transport engine (TE) 120, memory management unit (MMU) 130, SDRAM 140, video decoder 150 and RISC-DSP audio decoder 160. Data is read off an optical disk drive (not shown) and formatted into bytes by DVD-DSP interface 105. A small error-correction buffer within DVD-DSP Interface 105 is used to temporarily hold the data read-off the DVD drive during error detection and correction operations. DVD controller 110 ensures that the data stored in the error-correction buffer is error-free and that sufficient information is read off the optical disk to ensure continuous flow of data to transport engine 120. Transport engine 120, in turn, provides encrypted data to a descrambler (not shown), which decrypted (i.e., it performs data manipulation according to a decryption algorithm based on a secret key) the data. Transport engine 120 also provides DVD optical sector data for use in navigation.

Although a DVD decoder is described, those skilled in the art will realize that decoders other than a DVD decoder can use a RISC-DSP audio decoder. Accordingly, the invention is not limited to any particular type of decoder application.

Once the data has been decrypted, transport engine 120 generates separate audio and video streams from the bitstream provided by DVD-DSP interface 105. Transport engine 120 then transfers these streams, sometime referred to as "elementary streams," to MMU 130. MMU 130, in turn, stores the elementary streams into a track buffer. The track buffer is a virtual buffer stored in SDRAM 140.

Although an SDRAM is described, those skilled in the art will realize that storage devices other than an SDRAM can be used in place of SDRAM 140. Accordingly, the invention is not limited to any particular type of storage device.

MMU 130 maintains a series (e.g., 32) of virtual circular buffers in SDRAM 140 which are used to store compressed video and audio data that constitute the elementary streams, as well as navigation table data extracted by transport engine 120 from the raw DVD sector data. The navigation table data enables DVD decoder 100 to navigate the sectors of the optical disk in the appropriate sequence determined by a program. It is this "programmable" navigation feature of DVD disks, for example, that allows DVD disks to store multiple language sound tracks or multiple camera shots for a movie scene.

Video decoder 150 and RISC-DSP audio decoder 160 read the elementary streams from the track buffer, decode the compressed data (e.g., MPEG-1 or MPEG-2 data), and pass the resulting uncompressed data to memory management unit 130 that stores it in a frame buffer, which is also a virtual buffer within the circular buffers maintained by MMU 130 on SDRAM 140. Video output processor 170 and audio output processor 180 in turn read the uncompressed video and audio data stored in the frame buffer and generate signals that drive an integrated multimedia display system (e.g., a display device and a speaker system).

Architecture

Figure 3:
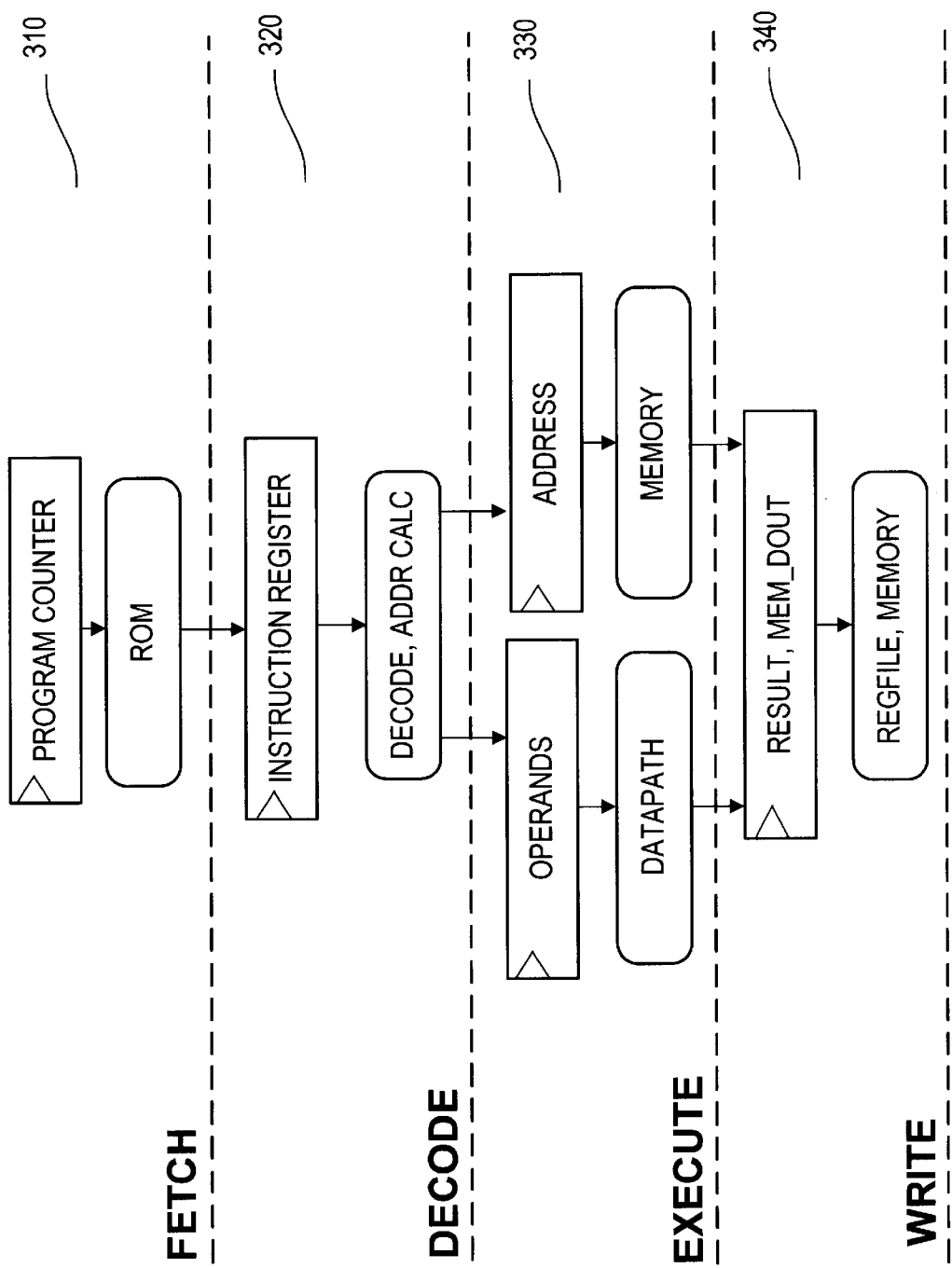
FIG. 3 is a block diagram of the pipelined instruction execution scheme of the present invention.
Figure 4:
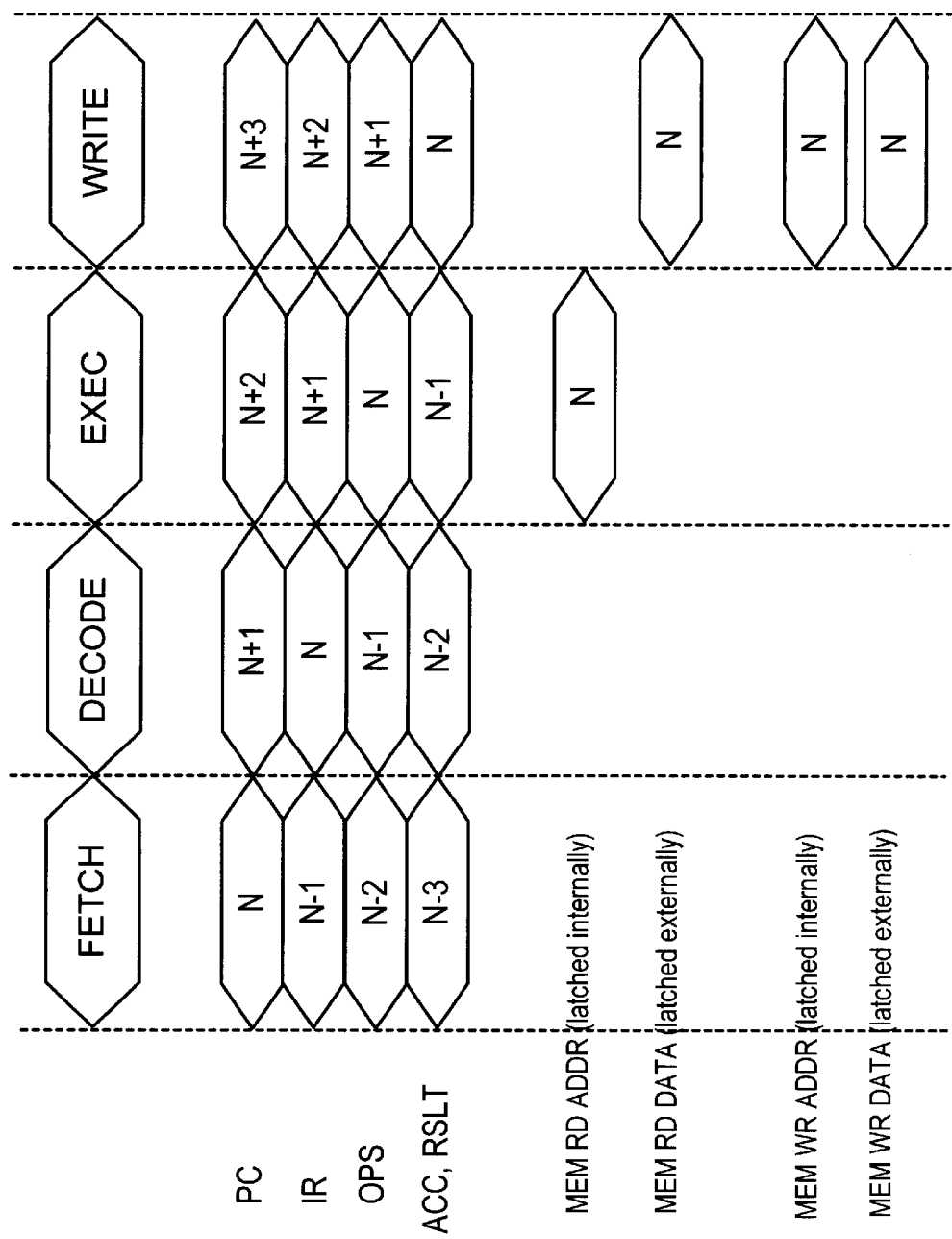
FIG. 4 shows the timing relationships between successive instructions in the pipelined execution scheme.

The RISC-DSP audio decoder 160 is organized around a four-stage pipeline architecture with a novel single-cycle multiply-accumulate (MAC) throughput. The architecture is optimized for executing one instruction per clock cycle. Separate program and data address spaces allow concurrent fetch of data and instruction. A four-stage pipelined architecture allows the overlapping of instruction execution, thereby achieving an effective throughput of one instruction per clock cycle. Each instruction takes four cycles to execute, and during each cycle a new instruction is being processed, thus a sustained rate of one instruction per clock cycle is achieved. The instruction execution process occurs in the sequence illustrated in FIG. 3. First, during the 'f' cycle instruction fetch 310, program-memory is read. Next, during the 'd' cycle, instruction decode 320, register file operands are read. Then, in the 'e' cycle, instruction execution 330, computation of the result takes place. Finally, in the 'w' cycle 340, the result write occurs. FIG. 4 shows the instruction timing resulting from the pipelined architecture.

The present invention supports single and loop repeats, normal and delayed branch instructions, and register-to-register computations. RISC-DSP audio decoder 160 further provides hardware support for division step and memory vector processing.

Figure 2:
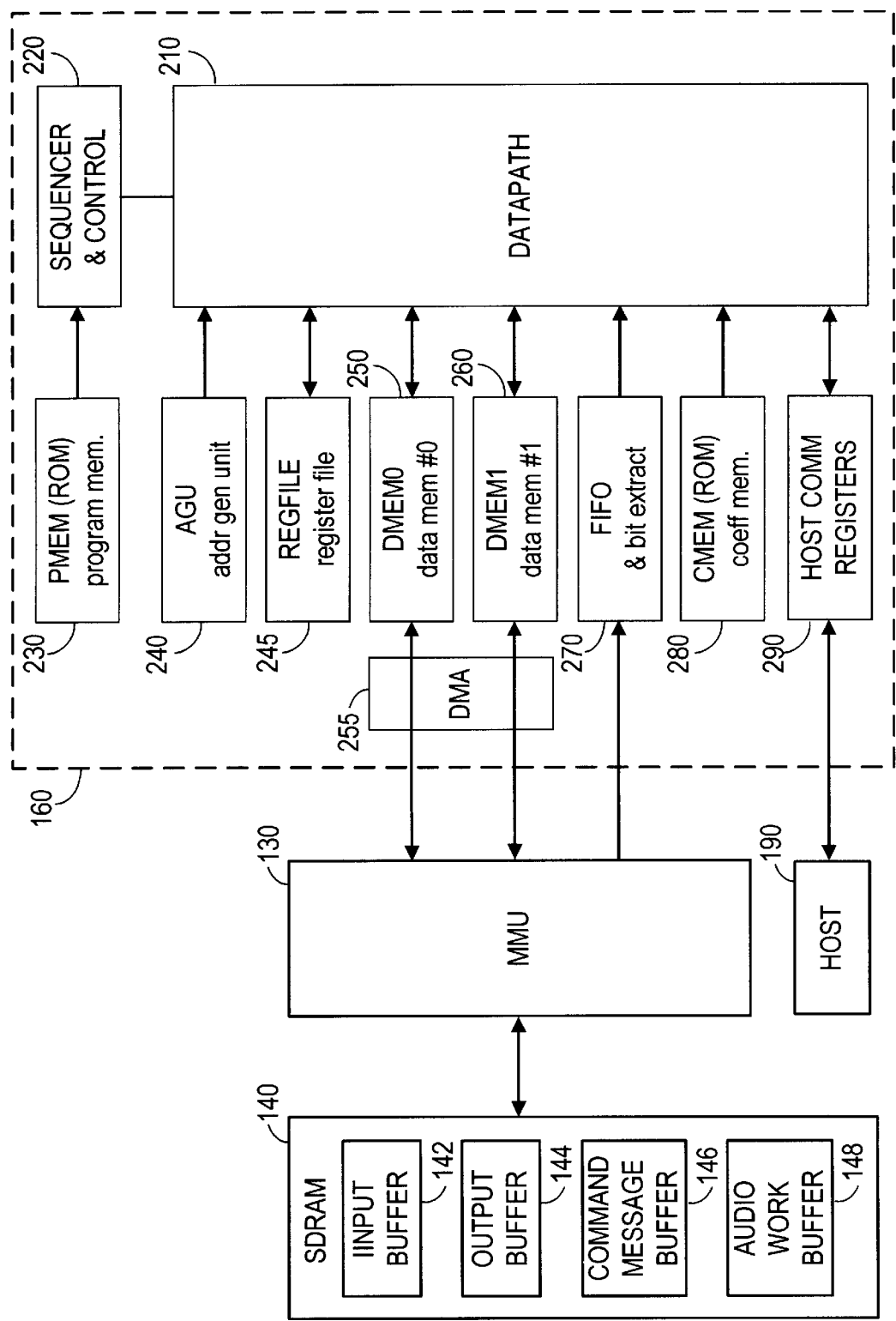
FIG. 2 is a block diagram of a RISC-DSP audio decoder, according to an embodiment of the invention

Referring to FIG. 2, RISC-DSP audio decoder 160 has separate 20- or 24-bit data and 24-bit instruction paths (not shown). It has internal program ROM (pmem) 230, an internal coefficient ROM (cmem) 280, two dual-port data memory arrays (dmem0 250 and dmem1 260) in RAM, and a register file 245. Internal coefficient ROM cmem 280 has special address generation, via address generation unit (AGU) 240 to hold MPEG and AC-3 audio coding-specific data. The internal dual port data memory arrays 250 and 260 permit two operand accesses per clock cycle; each has xbyte and xword addressibility. Xbyte is a 10 (or 12) bit quantity; xword is a 20 (or 24) bit quantity. An internal 32 byte FIFO register 270 provides means for reading the compressed (encoded) input bitstream; bit extract hardware is included to facilitate efficient reads.

Although a datapath width of 20 or 24 bits is described, one skilled in the art will appreciate that various widths are possible with the appropriate adjustments to related parameters. Accordingly, the present disclosure is not limited to data path widths of 20 or 24 bits.

Unlike the prior art DSPs, the present invention includes a register file 245 which contains eight or optionally sixteen 20 or 24 bit wide single-precision registers used as operands for most arithmetic operations. Register file 245 has two read ports and one write port. Two-level bypass logic is provided, allowing immediate reuse of a destination register as a source register for subsequent operations.

RISC-DSP audio decoder 160 contains four types of registers: reg, consisting of the general-purpose register file 245, including r0, r1, . . . , r15; areg, consisting of address registers associated with AGU 240, including $ap_0$, $ap_1$, . . . , $ap_7$, $ai_0$, $ai_1$, amask, abase, and agmode; ALU, the Arithmetic Logic Unit; and MMR, the memory-mapped registers.

The first type (reg) are single-precision general-purpose registers. These registers may be used as operands in most instructions and have no restrictions on pipelined use, as a result of dual-bypass logic. These registers are read in the 'd' cycle and written in the 'w' cycle.

The second type (areg) are the dedicated address registers. These registers may be used as operands in only some of the instructions, and some restrictions apply to subsequent reuse due to the pipeline delay. For example, after loading register $ap_1$, at least one instruction must precede using $ap_1$, for indirect addressing. The areg may be used only as destination operand (dest) or first source operand (src0). An areg is read in the 'd' cycle and written in the 'w' cycle.

The third type (ALU) are special-purpose registers. These registers are associated with vector processing and multiplication and are used in specially defined instructions. These registers include double-precision register Accumulator 218 (Acc), which is used for most vector-processing operations such as convolution. Double-precision adder 212 and shifter 214 allow single-cycle double-precision operation. A saturation unit at the output of shifter 214 allows saturated scaling in one operation. The 20-bit wide logic unit 219 supports standard and custom logic operations. Multiplier 216 is a 20×20 or 24×24 bit unit with a single internal pipeline stage. The 4-bit headroom in the datapath prevents intermediate result overflow in long vector operations.

The fourth type (MMR) are all other registers, such as status, control, DMA programming, stack, host interface, etc. These registers are accessed similarly to memory (i.e., load/store only), and are subject to pipeline delay restrictions. The stack (not shown) is an eight level stack for call and return functionality common in the art. Registers of type MMR are read in the 'e' cycle and written in the 'e' cycle.

The MMR addresses shown in Table 2 below are xbyte addresses. MMR access must be in xword mode, i.e., the lsb of the MMR address is always ignored.

TABLE 2

| ADDR | NAME | TYPE | WIDTH | DESCRIPTION |
|---|---|---|---|---|
| 0x0000 | FIFO_LJ | rd | 20 | read-only FIFO input, 16-bits left-justified (lsbs = 0). |
| 0x0002 | FIFO_RJ | rd | 20 | read-only FIFO input, 16-bits right-justified (msbs = 0). |
| 0x0004 | FIFO_SX | rd | 20 | read-only FIFO input, 16-bits right-justified and sign-extended. (function not implemented) |
| 0x0006 | | | | reserved. |
| 0x0008 | STAT | rd/wr | 20 | DSP status and mode control. |
| 0x000A | BITCNT | rd/wr | 5/4 | for write: FIFO bit extract block, bit count, number of bits to be extracted from the FIFO. for read: bit-extract hardware status. |
| 0x000C | TOTALCNT | rd/clr | 15 | compressed data bit counter. Cleared by any write operation. |
| 0x000E | | | | reserved. |
| 0x0010 | DMAIA | rd/wr | 13 | DMA internal xbyte address for dmem0/1 access. |
| 0x0012 | DMAEA | rd/wr | 20 | DMA external dword address for SDRAM access. |
| 0x0014 | DMACNT | rd/wr | 11 | DMA transfer RISC-DSP audio decoder 160 word count. |
| 0x0016 | DMACTL | rd/wr | 10 | DMA control bits (rd/wr) and status bits (rd-only). |
| 0x0018 | CBSCTL | rd/wr | 8 | CBS FIFO control bits (rd/wr) and status bits (rd-only). |
| 0x001A | | | | |
| 0x001C | | | | |
| 0x001E | | | | |
| 0x0020 | HOST_CPR | rd | 20 | RISC-DSP audio decoder 160 Command Pointer Register (read-only). A write to this address clears the command-valid flag. |
| 0x0022 | HOST_CTL | rd | 8 | as defined in host comm register section below. |

TABLE 2-continued

| ADDR | NAME | TYPE | WIDTH | DESCRIPTION |
|---|---|---|---|---|
| 0x0024 | HOST_STAT | rd/wr | 20 | as defined in host comm register section below. |
| 0x0026 | HOST_INTR | wr | 1 | RISC-DSP audio decoder 160-to-Host interrupt signal. A write to this address sets the interrupt bit. |
| 0x0028 | | | | |
| 0x0030 | MMU_IBRP | rd | 20 | MMU audio input buffer read pointer current value (dword address) |
| 0x0032 | MMU_OBWP | rd | 20 | MMU audio output buffer write pointer current value (dword address) |
| 0x0034 | MMU_IBLVL | rd | 16 | MMU audio input buffer level, in byte units. |

Host comm registers 290 consist of the following host-accessible registers: command pointer register (CPR) and command-valid flag, host control register, and host status register.

The host control register is read/write accessible to the host and is read-only accessible to RISC-DSP audio decoder 160. The Host Control Register is typically accessed by the host only during initialization and diagnostics procedures.

The host status register is read/write accessible to RISC-DSP audio decoder 160, and is read/clear accessible to the host. The host may poll this register at any time to check the RISC-DSP audio decoder 160 status or interrupt bit. In addition, as part of interrupt handling, the host must clear the interrupt bit by writing a '1' to it.

Resister Bitmaps

Bitmaps for each register are shown in Tables 3, 4, and 5 below.

Command Pointer Register

Table 3 shows the CPR bitmap.

TABLE 3

| | | Byte address = 0x30000. |
|---|---|---|
| b31:23 | | reserved |
| b22 | valid | 1 = Command in DRAM is valid (Command-Valid flag). HOST: rd/wr Decoder: rd/reset |
| b21:0 | ptr | byte address of command packet in DRAM. Must be dword-aligned, i.e. bits [1:0] must be 0. HOST: rd/wr Decoder: rd only power-on reset default value: 0x000000. |

Host Control Register

Table 4 shows the host control register bitmap.

TABLE 4

| | | Byte address = 0x30004. |
|---|---|---|
| b31:8 | | reserved |
| b7:2 | gpflag | general-purpose communication/control flags. if gpflag = 1 immediately after hardware reset, RISC-DSP audio decoder 160 enters an endless idle loop, which is used for memory tests. |

TABLE 4-continued

| | | Byte address = 0x30004. |
|---|---|---|
| b1 | nullify | 1=enable RISC-DSP audio decoder 160 instruction nullification. Should be set to 1 when host accesses dmem0, dmem1, cmem, or pmem. |
| b0 | rst | 1=hold RISC-DSP audio decoder 160 in reset state, 0=normal RISC-DSP audio decoder 160 operation. power-on reset default value: 0x0000. |

Host Status Register

Table 5 shows the host status register bitmap.

TABLE 5

| | | Byte address = 0x30008. |
|---|---|---|
| b31:21 | | reserved |
| b20 | intr | 1 = RISC-DSP audio decoder 160 to host Interrupt bit, can be cleared by the host writing a '1' to it. |
| b19:0 | sol | 'Signs-of-Life' RISC-DSP audio decoder 160 software status power-on reset default value: 0x0000. |

Stat: Status/Mode Register

The status register, Table 6, contains status bits, such as the arithmetic condition-codes.

TABLE 6

| b19:17 | PAGEC | CMEM PAGE ptr, the 3 msb of the address used in direct addressing mode. |
|---|---|---|
| b16:15 | PAGE1 | DMEM1 PAGE ptr, the 2 msb of the address used in direct addressing mode. |
| b14:12 | PAGE0 | DMEM0 PAGE ptr, the 3 msb of the address used in direct addressing mode. |
| b11:8 | RND | Rounding Mode:<br>0 = 0x00 0000 0000 no rounding<br>1 = 0x00 0000 1000<br>2 = 0x00 0000 2000<br>3 = 0x00 0000 4000<br>4 = 0x00 0000 8000<br>5 = 0x00 0001 0000<br>6 = 0x00 0002 0000 (20-bit normal/4, for fraction mpy w half coefs)<br>7 = 0x00 0004 0000 (20-bit normal/2, for normal fraction mpy)<br>8 = 0x00 0008 0000 (20-bit normal, half lsb)<br>9 = 0x00 0010 0000 |

TABLE 6-continued

|  |  |  |
|---|---|---|
|  |  | 10 = 0x00 0020 0000 (rnd for MPEG window for 16-bit output) |
|  |  | 11 = 0x00 0040 0000 |
|  |  | 12 = 0x00 0080 0000 |
|  |  | 13 = 0x00 0100 0000 |
|  |  | 14 = 0x00 0200 0000 |
|  |  | 15 = 0x00 0400 0000 |
| b7 | F1 | Flag1, user-programmable, general purpose. |
| b6 | SC | Swap Control, user-programmable, used by the swapc instruction. |
| b5 | F2 | Flag2, user-programmable, general purpose. |
| b4 |  | reserved. |
| b3 | C | Carry condition flag. C is set to 1 if an add operation produces carry-out condition, or if a subtract operation does not produce borrow-out condition. The C flag is associated with bits[31:16] of the adder only. |
| b2 | V | Overflow condition flag. |
| b1 | N | Negative condition flag. |
| b0 | Z | Zero condition flag. |
|  |  | power-on reset default value: 0x0000. |

The Z and N flags are modified by any add, shift or logic operation. The C flag is modified by add operation only. The V flag is set in case of single-precision-add overflow.

Agmode: Address Generation Mode Register

The Agmode register, Table 7, contains various special-purpose bits. It is part of the areg register-group.

TABLE 7

| b19:8 |  | reserved |
|---|---|---|
| b7:6 |  | reserved |
| b5:4 | src1_sel | selects a memory src1 for vector processing: |
|  |  | 0 = dmem0 |
|  |  | 1 = dmem1 |
|  |  | 2 = cmem |
|  |  | 3 = reserved |
| b3:2 | src0_sel | selects a memory src0/dest for vector processing: |
|  |  | 0 = dmem0 |
|  |  | 1 = dmem1 |
|  |  | 2, 3 = reserved |
| b1:0 | ap0_mode | selects ap0 mod of operation: |
|  |  | 0 = normal. |
|  |  | 1 = enable MPEG filter mode. This enables the operation of the coeff_invert signal out of ap0 bit [6], for filter calculations. |
|  |  | 2 = enable MPEG window 1st half mode. This enables the operation of the sample_invert signal out of ap0 and the address scrambling in ap0, for window calculations. |
|  |  | 3 = same as 2, but with reversing the polarity of the sample_invert signal out of ap0 for the 2nd part of the MPEG window. |
|  |  | power-on reset default value: 0x0000. |

Dmaia: Dma Internal Start Address Register

Table 8 shows the DMA internal start address register bitmap.

TABLE 8

| b19:13 |  | reserved. |
|---|---|---|
| b12:0 | ia | internal start address in dmem0 or dmem1. (byte address) |

Dmaea: Dma External Start Address Registers

Table 9 shows the DMA external start address register bitmap.

TABLE 9

| b19:0 | dmaea | external DRAM start address - dword address. |
|---|---|---|

Dmacnt: Dpram Dma Count Register

Table 10 shows the DPRAM DMA count register bitmap.

TABLE 10

| b19:11 |  | reserved. |
|---|---|---|
| b10:0 | cnt | transfer word count. Number of 20-bit words accessed in dmem0 or dmem1. Must be a multiple of 8 or 16 words, such that an integer number of 32-byte blocks are accessed in DRAM. |

Dmactl: Dma Control Register

Table 11 shows the DMA control register bitmap.

TABLE 11

| b19:10 |  | reserved |
|---|---|---|
| b9:6 | state | READ-ONLY: DMA state. |
| b5 | enable | 1=enable DMA transfer. also used as a BUSY bit. Cleared upon completion. |
| b4 | pack | packing mode: |
|  |  | 0=pack a 20-bit word into 32-bit DRAM dword, |
|  |  | 1=pack a 20-bit word into 16-bit Dram word. |
| b3 | dir | transfer direction: 0=DRAM to RISC-DSP audio decoder 160 (external to internal), 1=RISC-DSP audio decoder 160 to DRAM. |
| b2 | direct | 0=indirect, 1=direct addressing. |
|  |  | During DRAM read, indirect addressing means circular access of the audio Compressed Bit-Stream ('CBS') buffer using the current read pointer address maintained by the MMU. |
|  |  | During DRAM read, direct addressing, means linear access of the address provided by the DMAEA register. |
|  |  | During DRAM write, indirect addressing means circular access of the audio output buffer using the current write pointer address maintained by the MMU. |
|  |  | During DRAM write, direct addressing, means linear access of the address provided by the DMAEA register. |
| b1 | init | 1=abort any ongoing DMA activity and initialize. Must be zero for normal operation. |
| b0 | mem | 0=select dmem0 access, 1=select dmem1 access. |
|  |  | power-on reset default value: 0x0000. |

DMACTL must be written last, once all other parameters have been written.

Cbsctl: Cbs Fifo Control Register

Table 12 shows the CBS FIFO control register bitmap.

TABLE 12

| b19:8 |  | reserved |
|---|---|---|
| b7:4 | state | CBS FIFO state (full:high:low:empty). read-only bits |

TABLE 12-continued

| | | |
|---|---|---|
| b3:2 | bswap | byte swap control for the output of the compressed bitstream FIFO.<br>3 = no swapping.<br>2 = swap the words within the dword.<br>1 = swap the bytes within each word.<br>0 = swap the bytes within each word, and the words within the dword. |
| b1 | rst | 1 = reset CBS FIFO. |
| b0 | enable | 0 = disable, 1 = enable fetch from DRAM CBS buffer to RISC-DSP audio decoder 160 CBS FIFO when FIFO is low.<br>power-on reset default value: 0x0000. |

Address Generation Unit

The dedicated address generation unit (AGU) 240 includes four address pointer registers (discussed above), expandable to eight or more, and an indirect addressing mode. It has eight modes of address post-modification, including bit-reversed (reverse carry) mode.

MPEG Audio Decode Implementation

In both the MPEG-1 and -2 output modes, full support of the corresponding audio decode algorithms for layers 1 and 2 is provided, along with Karaoke support. In MPEG-2 mode, up to 5.1 channels, with no extension stream, of decode are supported. Output in both modes is provided in stereo format. In Karaoke mode, it is possible to output either the left or the right encoded channels to both output channels, or to output the 2 channels normally.

Additionally, the RISC-DSP audio decoder 160 can provide MPEG-1 or MPEG-2 compressed bitstream output by packing into the SPDIF (IEC-958) format.

RISC-DSP audio decoder 160 implements full MPEG-1 layer 1 and layer 2 decoding, as well as MPEG-2 layer 1 and layer 2 decoding of up to 2 channels. RISC-DSP audio decoder 160 does not support the MPEG-2 multi-channel extension. If a multi-channel stream is received, only the two backward-compatible channels are decoded. Alternate embodiments provide full support for multi-channel MPEG.

Due to its 20-bit datapath 210, RISC-DSP audio decoder 160 is capable of full accuracy compliance with MPEG specifications. Since only a two channel decoding is implemented, no external memory is required for filter and window processing. A 512-sample buffer per channel, required for the window operation, is maintained internally in dmem1 260.

The MPEG audio frame starts with a byte-aligned non-unique 12-bit sync word. The probability of a false sync appearing within a frame is about 28%. In order to achieve an acceptably low rate of false-sync events, the following scheme is used for synchronization. First, two consecutive sync words are detected, and the correct distance between them is confirmed by frame size calculation. Next, the header information of both frames is tested for consistency with the expected range of bit-rates, sampling rates, etc. The expected format (sampling rate and bit rate) is optionally provided to RISC-DSP audio decoder 160 by the Host 190, in which case the sync certainty level is higher. Finally, CRC error checking is performed. The combination of these measures reduces the probability of false sync to a negligible level.

Next, pre-processing of the input data stream is performed. Preprocessing requires mostly bit unpacking and table lookup. Useful hardware features include bit extract hardware, byte and word table lookup, and division step instructions.

Dequantization is next accomplished by storing 0.5× coeff, due to the maximum value of 2.0. (Coeff are the scaling coefficients used in the dequantization process. (Coefficients are stored negative to avoid +1 clipping to 0.9999. Additionally, rounding is done.

Denormalization is performed in a similar manner. Block float can be done, but it is not needed for improved SNR.

Filtering of the data is next performed. No folding is done for filtering (32×32 multiples) because, though folding saves cycles, folding increases quantization noise. A 64-entry sine wave table is used instead of 1024 entry filter coefficients table.

The filter is described by:

$$N_{ik} = \cos((16+i)*(2*k+1)*\Pi/64),$$

for i=0 to 63, k=0 to 31. There are a total of 64 unique values in the filter, all described by:

$$\cos(n*\Pi/64)$$

n=0,1,2, . . . ,63. Each filter group i has an initial entry point of (16+i) and increment of 2*(16+i).

Using these properties, a simple address generator and a 64-entry ROM will suffice. The address generation should do modulus 128 addition, the lower 6 bits access the ROM, and the 7th bit (msb) is the invert flag. The invert flag is passed to the datapath and indicates negating the coeff value (in the range $\Pi$ to 2*$\Pi$) by performing multiply and subtract instead of multiply and add.

NOTE: In the 64-entry ROM there are only 33 unique absolute values, but taking advantage of that to reduce the ROM size adds much complexity to the address generation.

In the MPEG specifications, 64 values are calculated in the filter. However, only 32 of those are unique, due to filter coefficient symmetries. In RISC-DSP audio decoder 160, only the 32 unique values are calculated, and stored sequentially in ROM. The calculated values are the outputs of filter groups 0–15 and 33–48. All other values are the same or negated version of the above, except for value number 16, which is always equal to 0.

Filtering is optimized by the use of special hardware. Sixty-four ROM locations, aligned on a 64-address boundary, are provided. An address pointer with modulus-128 arithmetic is also included. The six lsbs are concatenated to a base address and used as the ROM address. The 7th (msb) bit is the invert bit is passed to the datapath (this functionality is built into ap$_0$). The bit invert is active for all Vector Processing instructions, once enabled by programming agmode. Finally, special filter mode control bits are provided in the agmode register.

The window & reconstruction functions are performed in a single step. The RISC-DSP audio decoder 160 maintains compressed U/V arrays internally in dmem1 260 (1024 by 20), using circular buffer address generation and address scrambling. Window coefficients are folded once to save ROM (e.g., using 272 locations instead of 512). Address generation is accomplished in hardware for both samples and coefficients, including invert bits.

The window coefficients are reorganized in strides of 32, so each sequential group of 16 can be used to reconstruct one sample using MAC. The full-size window is 512, or 32 groups of 16. There is some symmetry that can be used to reduce ROM size. Only 17 of the 32 groups are unique; the rest are a negated replica of the first 15 groups. The group relation is:

$$grp[i]=-grp[32-i], \text{ for groups } 1 \ldots 15$$

Groups 0 and 16 have no pair. The total is thus 272 coefficients. Due to the compact format of the V vector, the lsb of the V address is passed through a lookup table to select the correct value (i.e. address scrambling). In addition, polarity information is generated to indicate whether the current value should be negated.

One skilled in the art will note that window group 16 always gets multiplied by V samples which are a result of filter groups 16 (s16) and 48 (s48), alternately. Coefficient s16 is always zero and is not stored in V. Coefficient s48 is non zero. Since s16 is not stored in V, some undefined value is read instead, and must be replaced by zero. This can easily be done by setting the EVEN coefficients in window group number 16 to zero.

Windowing is optimized by the use of special hardware. Memory for 272 ROM locations is provided. Circular addressing for samples, with 6-bit address scrambling, a sample-invert bit, and another bit to invert the polarity of the sample-invert bit in the 2nd part of the window is built into $ap_0$. The bit invert is active for all VPE instructions, once enabled by programming agmode. Furthermore, special window mode control bits are provided in the agmode register.

Special MPEG address pointers functions are as per Table 13.

TABLE 13

| OPERATION | COEFFICIENTS | SAMPLES |
|---|---|---|
| FILTER | | |
| POINTER POST-MODIFY | $ap_0$ ++$ai_0$ (2*2* (16+i)) | $ap_1$ ++ (+2) |
| INVERT | $ap0\_inv$ | no |
| CIRCULAR | circular mod 128 bytes | no |
| SCRAMBLE | no | no |
| WINDOW | | |
| POINTER POST-MODIFY | $ap_2$ ++$ai_1$ (+2 or −2) | $ap_0$ ++$ai_0$ (+2*32) |
| INVERT | no | $apo\_inv$, affected by 2nd half of window. |
| CIRCULAR | no | circular mod 1024 bytes |
| SCRAMBLE | no | yes |

Dolby AC-3 Audio Decode Implementation

For AC-3, all modes (2,6,8 channels) are supported. In Karaoke mode (and, optionally in normal mode), any downmix combination may be programmed by the host, by preparing an external downmix matrix which is loaded into RISC-DSP audio decoder 160 at the beginning of each frame.

Additionally, the RISC-DSP audio decoder 160 can provide AC-3 compressed bitstream output by packing into the SPDIF (IEC-958) format.

RISC-DSP audio decoder 160 implements a full 5.1 channel, class 'C' AC-3 decoder. Alternatively, a 24-bit data embodiment supports a class 'A' AC-3 decoder. All variables and small parameter arrays are stored internally in dmem0. The inverse DCT transform is done internally in dmem1. Various arrays are swapped between RISC-DSP audio decoder 160 internal memories and an external SDRAM, requiring external storage of less than 9 Kbytes and memory bandwidth of less than 2.3 Mbyte/sec.

PCM Audio Decode Implementation

The RISC-DSP audio decoder 160 supports the DVD PCM combinations shown in Table 14. Alternatively, a 24 bit embodiment supports the full DVD-audio specification for PCM (uncompressed) data.

TABLE 14

| MODE | INPUT CHANNELS | INPUT BIT WIDTH | OUTPUT CHANNELS | OUTPUT BIT WIDTH |
|---|---|---|---|---|
| 1-1 | mono | 16, 20, 24 | stereo (mono duplicated) | 16, 20 |
| 2-2 | stereo | 16, 20, 24 | stereo | 16, 20 |
| 6-6 | 6-channel surround | 16, 20, 24 | 6-channel surround | 16, 20 |
| 6-2 | 6-channel surround | 16, 20, 24 | 2-channel downmix | 16, 20 |
| 6-8 | 6-channel surround | 16, 20, 24 | 6-channel surround + stereo downmix | 16, 20 |
| x-1 | 1–8 channels | 16, 20, 24 | stereo, 1 selected channel duplicated | 16, 20 |
| Karaoke | 2 or 5 channels | 16, 20, 24 | 2 ar 6 channels | 16, 20 |

Note: In all modes, 20-bit output samples are placed in a 32-bit dword in the output buffer.

Mode 1-1 may be used on DVD disks for a generic, single-channel audio material.

Mode 2-2 may be used on DVD disks for a normal stereo audio program, similar to a standard audio Compact Disk (Audio CD).

Modes 6-6, 6-2, and 6-8 modes may be used if a DVD contains uncompressed 6-channel surround audio material. In this case, the data is assumed to be organized as Left, Center, Right, Left-surround, Right-surround, Low-frequency-effect. The output may be either the full 6 channels, a stereo downmix, or both. In the 6-2 and 6-8 modes, the stereo downmix equations are based on the ITU-R BS. 775-1 Recommendation (International Telecommunication Union, Broadcasting Service) as follows:

$$L'=L+0.707*C+0.707*Ls$$

$$R'=R+0.707*C+0.707*Rs$$

In addition, the L' and R' signals may be scaled down to avoid clipping.

The X-1 mode allows the playback of any one channel out of any number of channels present on the DVD.

The Karaoke mode allows any arbitrary downmixing from 2, 3, 4, or 5 input channels to 2 or 5 output channels (the 6th channel, low-frequency effects, is set to zero in this mode). In the Karaoke mode, Host 190 prepares an external downmix matrix which is loaded into RISC-DSP audio decoder 160 at the beginning of each frame-decode command execution.

RISC-DSP audio decoder 160 also supports optional down-sampling by a factor of 2 of the PCM data. This may be useful if the incoming PCM stream is at a sampling rate of 96 KHz, and the audio DAC supports only up to a 48 KHz sampling rate.

Additionally, RISC-DSP audio decoder 160 can provide PCM compressed bitstream output by packing into the SPDIF (IEC-958) format.

DTS Audio Decode Implementation

RISC-DSP audio decoder 160 can provide a DTS format compressed bitstream output by packing into the SPDIF (IEC-958) format. Alternatively, a 24-bit embodiment supports full DTS decoder.

Interfaces
To/From Host 190
Host to Decoder

The Host 190 to RISC-DSP audio decoder 160 communication is done via a command packet in the external SDRAM 140. A command packet size is an integral multiple of 32 bytes.

Host 190 writes a pointer to the packet into a Command Pointer Register (CPR), a register within host comm registers 290 (see FIG. 2), along with a command-valid flag bit. CPR must be loaded by Host 190 for each new command. First, Host 190 prepares a command packet in SDRAM 140, then it loads the pointer to the packet into CPR and sets the valid bit. Having read the command, RISC-DSP audio decoder 160 clears the valid bit, thereby indicating that CPR is available for loading the next command.

RISC-DSP audio decoder 160 polls the command-valid flag upon reset, at the end of each frame decode, and upon task completion. If the command-valid flag is set, RISC-DSP audio decoder 160 uses the pointer value to fetch the command packet from external SDRAM 140 into its internal RAM. RISC-DSP audio decoder 160 then clears the command-valid flag, freeing Command Pointer Register for the next command, effectively achieving command double-buffering. Host 190 is notified that CPR is available by a Command Acknowledge message. Command double-buffering allows Host 190 to queue the next task while the current task is being executed.

A command packet is a 32-byte (eight dword) data structure. Each dword contains one 20-bit xword (or two 10-bit xbytes) of valid data; the 12 most-significant-bits of each dword are unused. A command packet contains a specific RISC-DSP audio decoder 160 command and associated parameters.

Commands

RISC-DSP audio decoder 160 Decoder supports the following commands:

Idle/Noop Command

Refer to FIG. 5A. The Idle/Noop command may be used at any time. No operation is performed, except for updating the OP_MODE parameter. Command acknowledge and command completion messages are generated by RISC-DSP audio decoder 160 in response to this command.

Decode Command

Refer to FIG. 5B. The Decode command decodes n frames (n>=1), with m blocks skipped or repeated per frame (m=0, 1, 2, etc.).

In slave mode, the FRM_CNT parameter specifies how many frames to decode. The SAMP_CNT parameter specifies how many blocks to skip or repeat in each frame (NOTE: the SAMP_CNT is applied to all the frames decoded by the same command).

In free-run mode, the FRM_CNT parameter is ignored. If SAMP_CNT is non-zero, the command will be applied to a single frame decode, and normal frame decode will be resumed thereafter. If a new set of parameters is specified (e.g., new INBUF_THRESHOLD), it will be applied to all subsequent frame decode operations.

Command acknowledge and command completion messages are generated by RISC-DSP audio decoder 160 in response to this command.

Skip Command

Refer to FIG. 5C. The skip command decodes n frames (n>=1), but output no data (frame skip).

In slave mode, the FRM_CNT parameter specifies how many frames to skip. In free-running mode, the FRM_CNT parameter is ignored, one frame is skipped, and normal frame decode will be resumed thereafter. If a new set of parameters is specified (e.g., new INBUF_THRESHOLD), it will be applied to all subsequent frame decode operations.

Command acknowledge and command completion messages are generated by RISC-DSP audio decoder 160 in response to this command.

Output Command

Refer to FIG. 5D. The output command does not read any input, but output n times m blocks to the output buffer (m=1, 2, 3, etc.) by re-using old data or by generating silence data. The Output command is used to generate output data without consuming input data.

In slave mode, FRM_CNT specifies how many times SAMP_CNT blocks are output. In other words, if FRM_CNT=n, and SAMP_CNT=m, then a total of m*n blocks will be output.

In free-run mode, FRM_CNT is ignored, SAMP_CNT blocks are output, and then normal frame decode is resumed. If a new set of parameters is specified, it is applied to all subsequent frame decode operations.

Command acknowledge and command completion messages are generated by RISC-DSP audio decoder 160 in response to this command.

Soft Reset Command

Refer to FIG. 5E. Soft Reset effects a complete initialization. The Soft Reset fully initializes RISC-DSP audio decoder 160. All arrays and variables are initialized and new external DRAM pointers are set. The operation mode is forced to slave mode, and RISC-DSP audio decoder 160 awaits further commands.

Command acknowledge and command completion messages are generated by RISC-DSP audio decoder 160 in response to this command.

Load Specific Parameter (LoadS)

Refer to FIG. 5F. Load S loads one or more specific parameters into RISC-DSP audio decoder 160.

Load S command allows the host to load one, two, or three parameters into RISC-DSP audio decoder 160. Command acknowledge and command completion messages are generated by RISC-DSP audio decoder 160 in response to this command.

Load Parameters (LoadP)

Refer to FIG. 5G. Load P loads decoder parameters. The host uses this command to initialize RISC-DSP audio decoder 160 for a particular decode task, specifying all the basic parameters associated with it, such as sampling rate, sample size, number of channels, etc.

Command acknowledge and command completion messages are generated by RISC-DSP audio decoder 160 in response to this command.

Dump Command

Refer to FIG. 5H. Dump internal memory to external DRAM.

Command Packets

Command packets in one embodiment of the present invention consist of the following parameters:

CMD_ID: Command ID b[3:0] command running count, to be reflected in the command completion message.

b[9:4] A constant 6-bit value (=0x2A), used to indicate a valid command packet. If the ID is incorrect, RISC-DSP audio decoder 160 ignores the command and generates an error message.

OP_MODE: Operation Mode b[0] 0=slave coprocessor, 1=free-running mode.

b[4:1] Interrupt-Enable word for RISC-DSP audio decoder 160-to-host message interrupt. Bits 1–4 correspond to message types 1–4. 0=disable, 1=enable interrupt for the corresponding message type.

b[6:5] byte-swap control for the output of the compressed bitstream FIFO (Soft-Reset only).

3=no swapping,
2=swap the words within the dword,
1=swap the bytes within each word,
0=swap the bytes within each word, and the words within the dword.

b[9:7] reserved.

This parameter accompanies all commands and may be modified at any time, except for the byte-swap control bits, which are applicable only during a Soft-Reset command.

The byte-swapping option is further described in Table 15.

TABLE 15 b[6:5] = 3, no swapping (3-2-1-0)

| b 31 | | b 24 | b 23 | | b 16 | b 15 | | b 8 | b 7 | | b 0 |
|---|---|---|---|---|---|---|---|---|---|---|---|
| byte 3 | | | | byte 2 | | | | byte 1 | | byte 0 | | b[6:5] = 2, swap words within the dword (1-0-3-2)

| b 31 | | b 24 | b 23 | | b 16 | b 15 | | b 8 | b 7 | | b 0 |
|---|---|---|---|---|---|---|---|---|---|---|---|
| byte 1 | | | | byte 0 | | | | byte 3 | | byte 2 | | b[6:5] = 1, swap bytes within each word (2-3-0-1)

| b 31 | | b 24 | b 23 | | b 16 | b 15 | | b 8 | b 7 | | b 0 |
|---|---|---|---|---|---|---|---|---|---|---|---|
| byte 2 | | | | byte 3 | | | | byte 0 | | byte 1 | | b[6:5] = 0, swap both bytes and words (0-1-2-3)

| b 31 | | b 24 | b 23 | | b 16 | b 15 | | b 8 | b 7 | | b 0 |
|---|---|---|---|---|---|---|---|---|---|---|---|
| byte 0 | | | | byte 1 | | | | byte 2 | | byte 3 | |

HOST_CMD: Host Command b[0]0=resume using current state, 1=initialize state before execution.

b[5:1]0=Idle/Noop
  1=Decode: normal decode operation with optional skip/repeat.
  2=Skip: decode with output disabled (read input, no output)
  3=Output: output data without decode (no input, generate output)
  4=Soft Reset
  5=LoadS: load specific parameter
  6=LoadP: load decoder parameters
  7=Dump: Dump dmem0, dmem1, and cmem to external DRAM.
  8–31=reserved.

b[9:6] reserved.

CMD_MODE b[1:0] In KARAOKE MODE, for MPEG: 0=normal, 1=Left to both, 2=right to both, 3=reserved. For AC-3: 0=no vocal, 1=left vocal, 2=right vocal, and 3=both vocal. For PCM inputs, reserved.

b[2] External Downmix Matrix: for MPEG: reserved. For AC-3 and PCM: 0=do not use, 1=use external downmix matrix.

b[3] Error Concealment: 0=normal (active), 1=disable error concealment.

PARAM_COUNT: Parameter Count

Specifies the number of parameters loaded by the LoadS command. Must be 1,2, or 3.

Parameter Index and Value

The LoadS instruction provides a way to load specific RISC-DSP audio decoder 160 parameters by specifying an index and a value. The parameter index list is as per Table 16.

TABLE 16

| INDEX | DESCRIPTION |
|---|---|
| 0 | Reserved |
| 1 | AC-3 Dynamic range compression cut scale factor (20 Bits, default = 0X7FFFF). Valid number = 0x00000 to 0x7FFFF. |
| 2 | AC-3 Dynamic range compression boost scale factor (20 Bits, default = 0x7FFFF). Valid number = 0x00000 to 0x7FFFF. |
| 3 | Trick Mode Control (applicable to free-running mode only) b[8:0] number of frames to skip or repeat for each frame that is decoded normally. b[9] 0=skip, 1=repeat. b[19:10] reserved. This parameter is initialized to zero upon power-up and soft reset, and must be zero for normal operation. EXAMPLES: 1. if b[9]=0 and b[8:0]=2, RISC-DSP audio decoder 160 will decode one frame and then skip 2 frames, effectively implementing a 3-to-1 fast-forward operation. 2. If b[9]=1 and b[8:0]=1, RISC-DSP audio decoder 160 will decode one frame and then repeat one frame, effectively implementing a 2-to-1 slow-motion operation. |
| 4 and up | Reserved |

DECODER_SEL: Decoder Select b[3:0] decoder selection
  0=MPEG Decode
  1=MPEG SPDIF
  2=AC-3 Decode
  3=AC-3 SPDIF
  4=PCM Decode
  5=PCM SPDIF
  6=DTS Decode (not currently supported)
  7=DTS SPDIF
  8–15=reserved.

PAR1: Audio Parameter #1 b[3:0] expected sample rate.
  0=22.05 KHz
  1=24.00 KHz
  2=16.00 KHz
  3=unknown
  4=44.10 KHz
  5=48.00 KHz
  6=32.00 KHz
  7=unknown
  8=96.00 KHz (PCM only)

9=96.00 KHz (PCM only), to be down-sampled to 48.00 KHz.

10–15=reserved.

This parameter accompanies the LoadP command.

PAR2: Audio Parameter #2 b[3:0] expected number of Input channels (1–8, 0=unknown).

This parameter accompanies the LoadP command.

PAR3: Audio Parameter #3 b[3:0] input sample bit width (PCM only)

0=16 bits.

1=20 bits.

2=24 bits.

This parameter accompanies the LoadP command.

PAR4: Audio Parameter #4 b[3:0] number of Output channels (1–6).

b[4] 1=6+2 mode (full multi-channel plus stereo downmix)

This parameter accompanies the LoadP command.

PAR5: Audio Parameter #5 b[3:0] output sample bit width

0=16 bits.

1=20 bits (PCM only)

This parameter accompanies the LoadP command.

PAR6: Audio Parameter #6 b[3:0] Mux mode. For PCM X-1 mode, selects which input channel is passed to the output. For AC3: Output channel configuration 0=2/0 (L, R) Dolby Surround compatible.

1=1/0 (C, not supported in RISC-DSP audio decoder 160)

2=2/0 (L, R)

3=3/0 (L, C, R)

4=2/1 (L, R, SL)

5=3/1 (L, C, R, SL)

6=2/2 (L, R, SL, SR)

7=3/2 (L, C, R, SL, SR)

Lfe channel will be output based on bit stream when output channel number=6, or 8.

b[5:4] Dynamic range compression mode (AC-3 only):

0=analog dialnorm

1=digital dialnorm

2=line out mode

3=RF remod mode

Use heavy compression dynamic range parameter in compressed bit stream. This parameter accompanies the LoadP command.

FRM_CNT: Frame Count b[9:0] number of audio frames to be decoded or skipped. For the Output command, it is the number of times that SAMP_CNT blocks are output.

Frame size is 384 samples (MPEG Layer 1), or 1152 samples (MPEG Layer 2), or 1536 samples (AC-3), or 80 samples (48 KHz PCM), or 160 samples (96 KHz PCM). This parameter accompanies the Decode, Skip, and Output commands.

SAMP_CNT: Skip/Repeat/Output Sample Count b[9:0] number of sample blocks per channel.

This parameter accompanies Decode and Output commands. For Decode, it is the number of sample blocks per channel to be skipped or repeated in every frame decoded within the same command. It is a 10-bit two's complement signed number. A positive value means repeat, a negative value means skip. Must be zero for a normal frame decode. This number must not exceed the size of a frame (12 blocks for MPEG layer 1, 36 blocks for MPEG layer 2, 6 blocks for Dolby AC-3, 1 block for PCM). This parameter is ignored in a Skip command.

For Output, it is the number of sample blocks per channel to be generated and written to the output buffer. It is a 10-bit unsigned number.

Silence

This parameter is associated with the Output command only.

0=normal error-concealment data, re-using previous frame data

1=silent error-concealment data, with smooth transition to silence

INBUF_THRESHOLD: Input Buffer Threshold b[9:0] the minimum number of dwords in the input buffer required before starting frame decode in free-run mode.

This parameter accompanies only Decode and Skip commands and is used only in free-run mode.

Volume Level b[19:0] a 20-bit value used as a multiplier to scale the audio samples. Scaling range is 0 to x16.

0x7FFFF=x16 (+24 dB) scaling.

0x40000=x8 (+18 dB) scaling.

0x20000=x4 (+12 dB) scaling.

0x10000=x2 (+6 dB) scaling.

0x08000=x1 (0 dB) scaling.

0x04000=x0.5 (−6 dB) scaling.

etc.

This parameter accompanies Decode, Skip, and Output commands and may be modified at any time.

STATUS_SELECT b[19:0] byte address of a dmem0 internal variable to be output as status in subsequent messages. The address must be word-aligned.

MSG_BUF_PTR: Pointer to Message Buffer b[19:0] a dword address of the audio message buffer in the external DRAM.

MSG_BUF_SIZE: Message Buffer Size b[19:0] message buffer size in dwords.

WORK_BUF_PTR: Pointer to Work Buffer b[19:0] a dword address of the audio work buffer in the external DRAM.

WORK_BUF_SIZE: Work Buffer Size b[19:0] work buffer size in dwords.

CBS_BUF_PTR: Pointer to Input Buffer b[19:0] a dword address of the audio input buffer in the external DRAM.

CBS_BUF_SIZE: Input Buffer Size b[19:0] input buffer size in dwords.

DNMIX_MAT_PTR: Pointer to External Downmix Matrix b[19:0] a dword address of the external downmix matrix in the external DRAM.

PACK_EXT_PTR: Packet extension Pointer b[19:0] a dword address pointing to the packet extension data.

In cases when additional data is associated with the command packet, this dword address points to a command packet extension data structure, a 32-byte block similar to the command packet.

Decoder to Host Communication

RISC-DSP audio decoder 160 to Host 190 communication is done via virtual command message buffer 146 in external SDRAM 140, using an interrupt. RISC-DSP audio decoder 160 generates the following message types:

type 1: command completion type 2: error detection type 3: sync word found, input/output buffer pointer information type 4: command acknowledge (indicates that a command was received and that the CPR is free to accept the next command pointer)

Each message type may be accompanied by an interrupt. A 4-bit Interrupt Enable word provided by Host 190 is used to determine which message type creates an interrupt. The default setting is that none of the message types creates an interrupt (mask=0).

RISC-DSP audio decoder 160 messages are written into virtual command message buffer 146 in the external SDRAM. Command message buffer 146 is implemented as a circular FIFO buffer, managed by RISC-DSP audio decoder 160 software. Host 190 provides the base address and the size of buffer 146 upon RISC-DSP audio decoder 160 initialization.

A message packet is a 32-byte (eight dword) data structure. Each dword contains one 20-bit xword (or two 10-bit xbytes) of valid data; the 12 most significant bits of each dword are unused. Since a message packet has a fixed size of 32 bytes, command message buffer 146 must be sized to a multiple of 32 bytes. There is no protection against buffer 146 overflow. Host 190 must keep up with the accumulating messages.

Message Packets

A message packet is a 32-byte (8 dwords) data structure. Each dword contains one 20-bit xword (or 2 10-bit xbytes) of valid data; the 12 most significant bits of each dword are unused.

FIG. 6A illustrates the bitmap of the various message packets in accordance with one embodiment of the present invention. In particular, FIG. 6A shows the Command Completion Message; FIG. 6B shows the Error Detection Message; FIG. 6C shows the Syncword Found Message; and FIG. 6D shows the Command Acknowledge Message.

Message packets in one embodiment of the present invention consist of the following parameters:

MSG_ID: Message ID
b[7:0] message number. This 8-bit value is incremented every message. It may be used by the host to confirm receipt of all messages in order and to detect message buffer overflow condition.
b[9:8] fixed constant=0x1, indicating a valid message packet.
CMD_ID: Command ID
A copy of the same field in the command packet, used to associate a message with a particular command.
MSG_TYPE: Message Type
b[9:0] message type number, as described above.
FW_REV_ID: Firmware Revision ID
b[9:4] RISC-DSP audio decoder 160 firmware, major revision ID number.
b[3:0] RISC-DSP audio decoder 160 firmware, minor revision ID number.
RET_CODE: Return Code
b[9:0] RISC-DSP audio decoder 160 return code, as defined in Table 17 below. In case of a Sync-Found message in free-running mode, the return-code is associated with the previous frame decode.

TABLE 17

| CODE | NAME | DESCRIPTION |
| --- | --- | --- |
| 0x00 | RC_OK | successful command completion or frame decode. |
| 0x01 | RC_ILLEGAL | error: illegal command received. |
| 0x02 | RC_NOSYNC | error: sync word not found within (about) 4 KBytes of input data. |
| 0x03 | RC_LAYER | error: unsupported MPEG layer or unsupported AC-3 stream format. |
| 0x04 | RC_HEADER | error: illegal or unexpected header info found. |
| 0x05 | RC_CRC | error: CRC error found. |

TABLE 17-continued

| CODE | NAME | DESCRIPTION |
| --- | --- | --- |
| 0x06 | RC_FRMSIZE | error: extracted frame size exceeded the expected frame size. |

OUTBUF_WR_PTR, INBUF_RD_PTR
b[19:0] the current state of the output buffer write pointer and the input buffer read pointer, in dword units.
INBUF_LEVEL
b[9:0] the current state of the input buffer level register, in 64-byte units.
HOST_CMD
b[4:0] a copy of bits [5:1] from the same field in the command packet.
b[9:5] reserved.
FRM_NUMBER
b[19:0] a running count of the frames decoded since last soft reset.
Status
b[19:0] a RISC-DSP audio decoder 160 status word (mostly for diagnostics), selectable by the host via the STATUS_SELECT parameter.
SAMPRATE, LAYER, NCHANS, BITRATE, FRM_SIZE
Parameters directly decoded or computed from the audio bitstream.
NCHANS: number of audio channels in the input bit-stream (including LFE).
SAMPRATE: sample rate in the same format as described in AUDIO_PARAMS above.
LAYER for MPEG: 1=MPEG layer 1, 2=MPEG layer 2. For PCM, SPDIF it is the DECODER_SEL value. For AC-3 it is F{(BSID <<3) | BSMOD}.
FRM_SIZE for MPEG: size in dwords of the last decoded frame. For PCM, SPDIF: unused. For AC-3: the frmsize-cod parameter.

Host Bus

The host bus allows Host 190 to read and write several control and communication registers in host comm registers 290, as well as to access internal memory arrays. The host bus is a 32-bit wide internal data bus. All accesses to the internal registers are aligned dword (4-byte) accesses.

Data Validation

RISC-DSP audio decoder 160 checks the incoming data integrity by performing sync word detection, header information validation, CRC error checking, and frame size checking.

To start decoding a frame, a valid sync word must be found. Then the frame header is decoded, and its parameters are compared against the expected parameters (either the parameters provided by the host or the parameters of the last valid frame). Then the CRC-protected side information is decoded and checked. Finally, upon completion of frame decode, the amount of data read is compared to the expected frame size.

Figure 7:
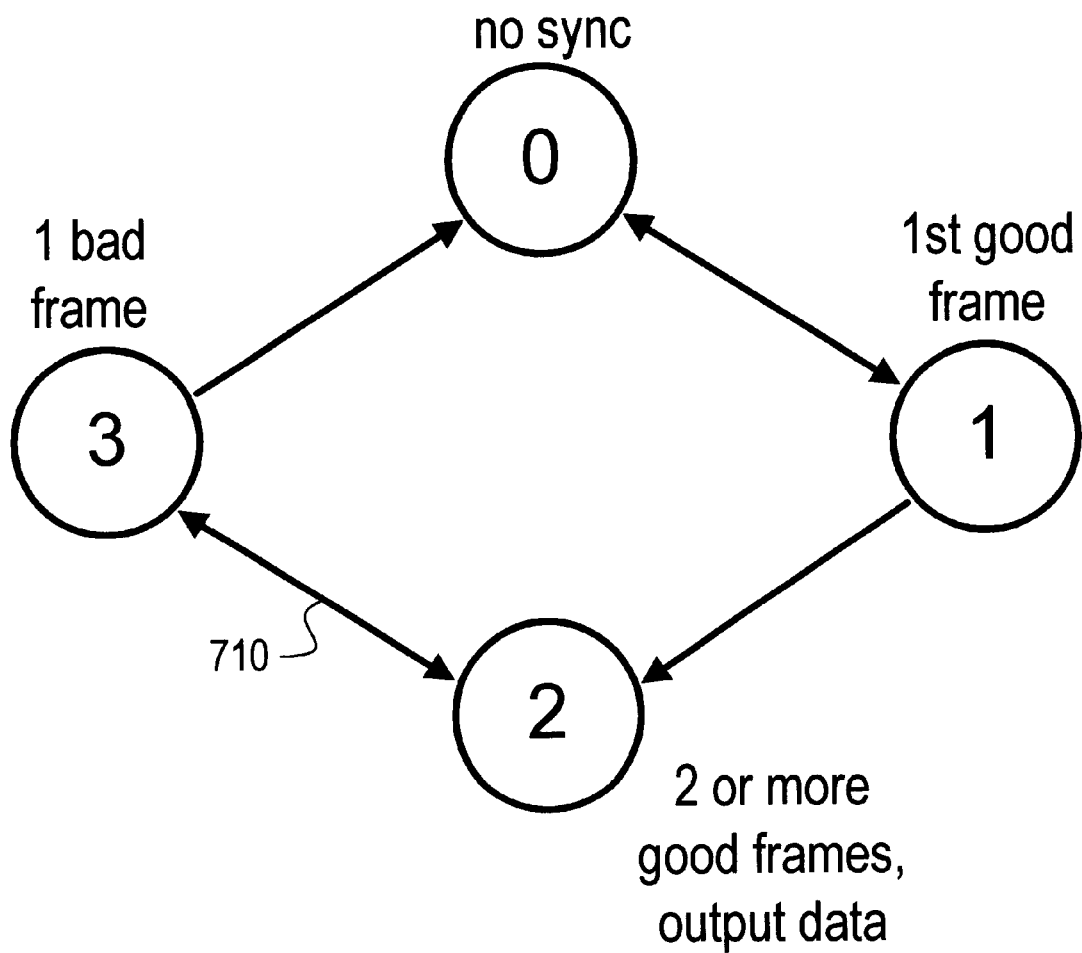
FIG. 7 is a schematic of the data output synchronization state machine according to an embodiment of the invention.

Data output is controlled by a 4-state state-machine, as described in FIG. 7. Data output is enabled only after one (or more) good frame has been decoded and the current frame has a valid header and CRC (state 2).

Upon hitting an occasional bad frame, the state machine goes to state 3. If the bad frame was an isolated event, the state machine returns to state 2, thus losing only one frame. Otherwise, the state machine goes to state 0, and a minimum of two frames are lost. In states 0 and 1, no data is output. In state 3, error-concealment data is output. In state 2, the real data is output to the audio output buffer.

The bi-directional transition 710 between states 2 and 3 provides fast recovery (one frame time) from occasional errors. The path from states 0 to 1 to 2 provides robust sync detection and avoidance of false sync words. Thus the 4-state design features both fast error recovery and robust sync detection.

To/From Memory

Physical access to external memory SDRAM 140 is accomplished via two I/O devices: Input FIFO 270 (read only) and DMA 255 (read/write).

Figure 11A:
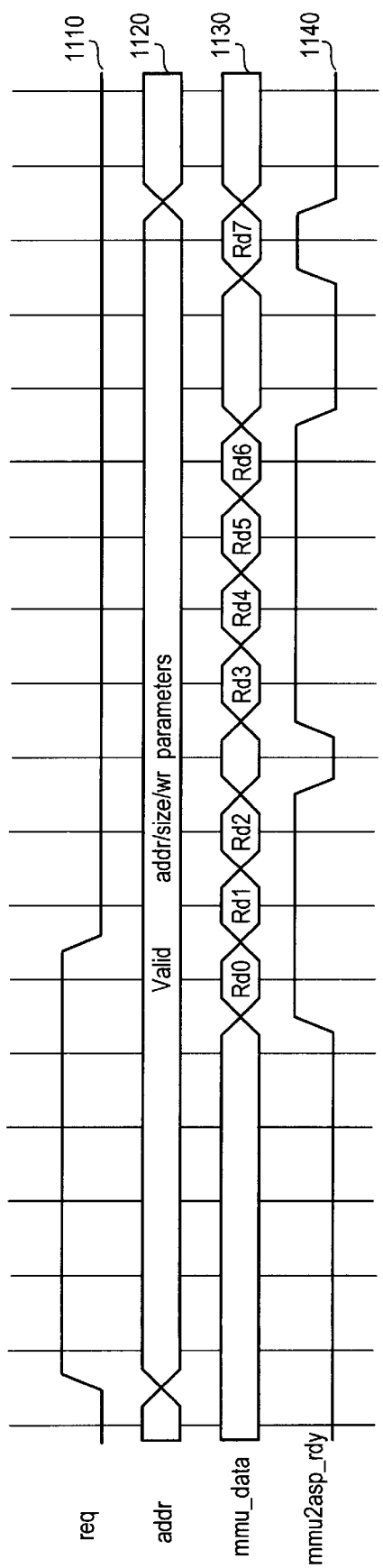
FIGS. 11A and 11B illustrate the timing relationships in a data access Read cycle and a data access Write cycle, respectively, according to one embodiment of the invention.
Figure 11B:
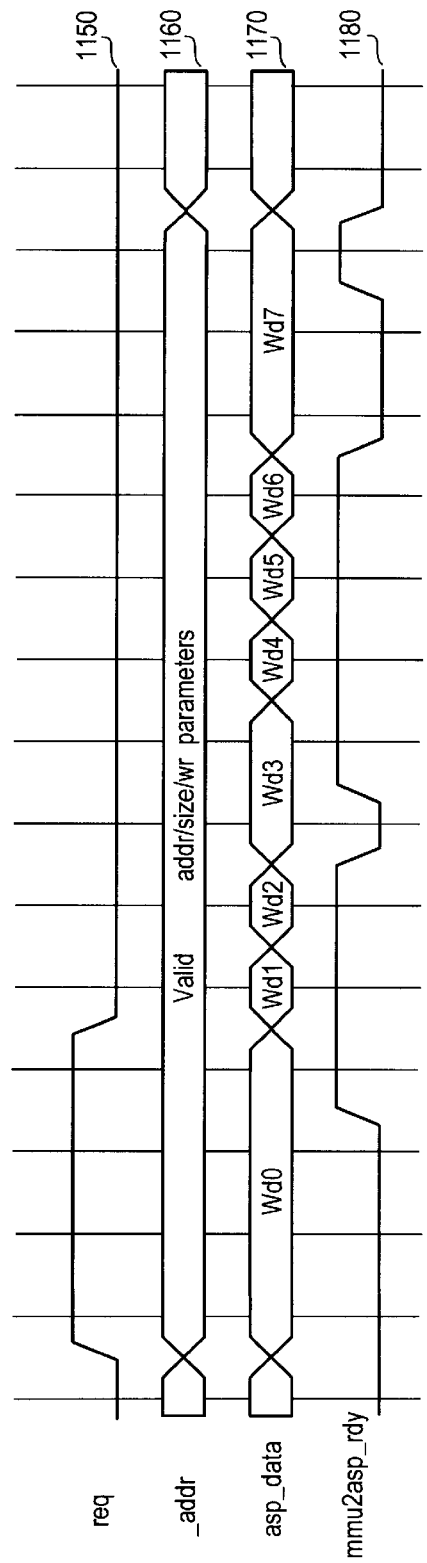

DMA access is accomplished over a 32-bit interface via MMU 130. Referring to FIG. 2, DMA interface 255 provides for both a direct and indirect access path into two dedicated, circular audio data buffers, input buffer 142 and output buffer 144, implemented as virtual buffers in SDRAM 140. For direct memory access (DMA), RISC-DSP audio decoder 160 provides an absolute address, a burst size indicator of 16 or 32 bytes, and the data transfer direction as parameters. The timing relationships are illustrated in FIG. 11A (read) and FIG. 11B (write). For indirect access (read-only from input buffer 142 and write-only to the output buffer 144), MMU 130 handles the actual physical location of the data, so the address parameter is ignored.

DMA 255 can be programmed to transfer data between external SDRAM 140 and internal dmem0 250 or dmem1 260. DMA activity is controlled from RISC-DSP audio decoder 160 by programming the Memory Mapped Registers (MMR).

RISC-DSP audio decoder 160 monitors the DMA activity by polling a Busy Bit within MMR (not shown). When DMA uses a dmem port, RISC-DSP audio decoder 160 cannot use the same port. For example, if DMA 255 is programmed to read dmem0, RISC-DSP audio decoder 160 cannot read dmem0 as long as the Busy Bit(DMACTL) is non-zero.

DMA 255 uses a 32-byte (eight entries by 32-bit) internal FIFO (not shown). For SDRAM write, dmem data is first packed into the internal FIFO then written to SDRAM 140. For SDRAM read, data is read into the internal FIFO then unpacked into dmem.

There are two modes of packing. In the first mode, for 20-bit intermediate audio data, each 32-bit SDRAM word is mapped into one 20-bit dmem word, discarding upper bits. In the second mode, used for PCM samples and for 16-bit range data arrays (bit allocation, etc.), each 32-bit SDRAM word is mapped into two 20-bit dmem words, putting 16 bits in each and sign-extending 16 to 20 bits.

To start a transfer, RISC-DSP audio decoder 160 writes internal addr into DMAIA, external addr into DMAEA, xfer count into DMACNT, and control into DMACTL. DMAIA, DMAEA, and DMACNT (not shown) are memory mapped registers discussed above. DMAIA must be xword-aligned. DMAEA must be SDRAM dword-aligned. DMACNT must be a multiple of 8 (packing mode 1) or 16 (packing mode 2) xwords.

FIFO 270 is typically used to input a compressed bitstream for processing. The state of FIFO 270 (valid data available/not available) is visible to the programmer as one of the branch conditions. Keeping FIFO 270 full is controlled outside the RISC-DSP audio decoder 160. At the FIFO output there is bit-extract hardware to facilitate extracting any number of bits (1 to 16) from the bitstream. To read n bits (n=1 to 16), bitcnt is loaded with n−1 prior to data read. The FIFO output data is either left-aligned or right-aligned in the 20-bit word and is padded with zeros.

Time Synchronization

Figure 8A:
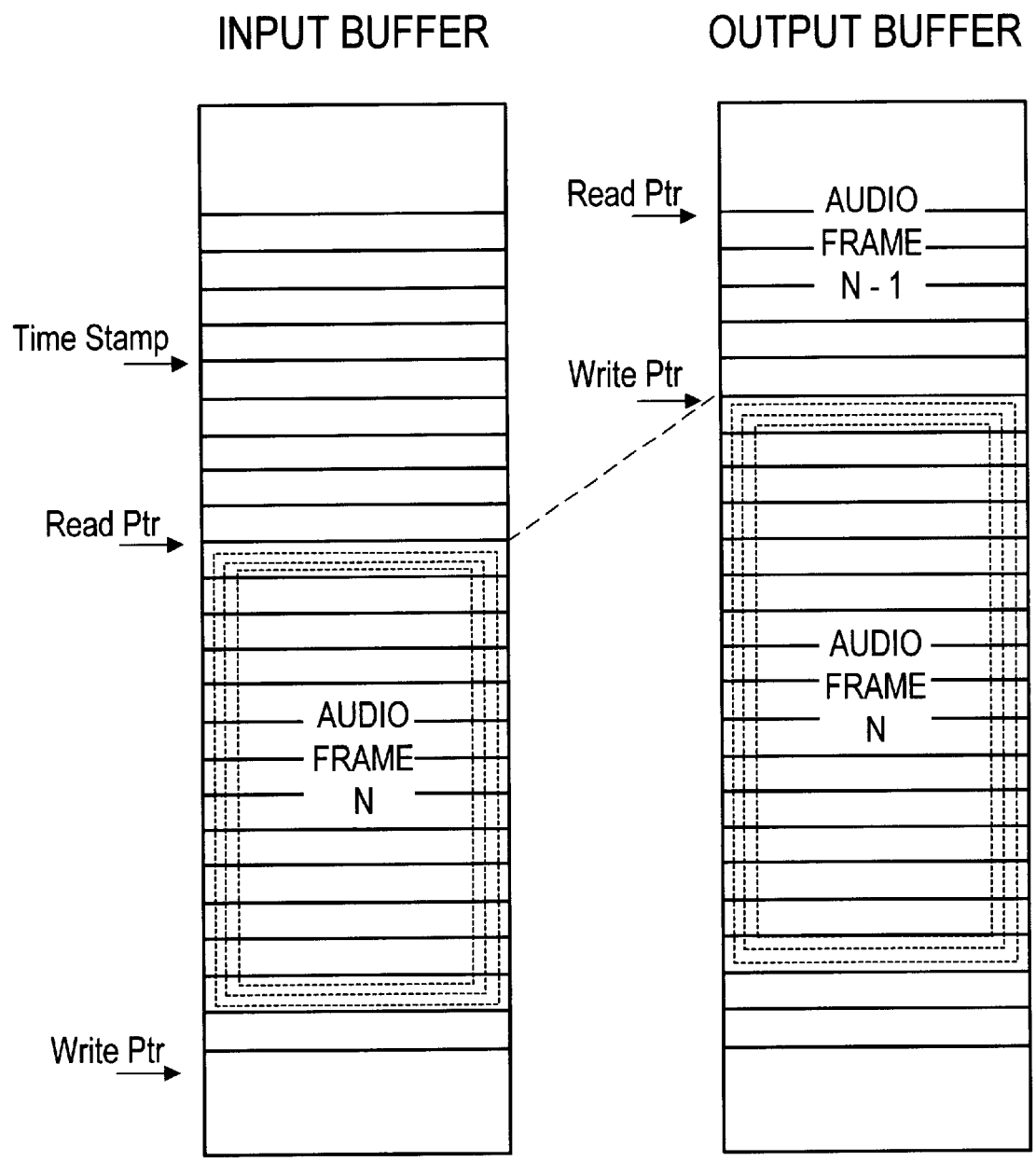
FIG. 8A is a schematic representation of the time synchronization between data in the input and output buffers according to one embodiment of the invention.

The Sync-Found message is used by Host 190 to associate a time-stamp with a particular sample in the input buffer and output buffer, and thus provide a way for Host 190 to monitor and adjust the audio presentation time to the system time. FIG. 8A illustrates the frame synchronization relationships between the input and output buffer and the respective pointers.

Figure 8B:
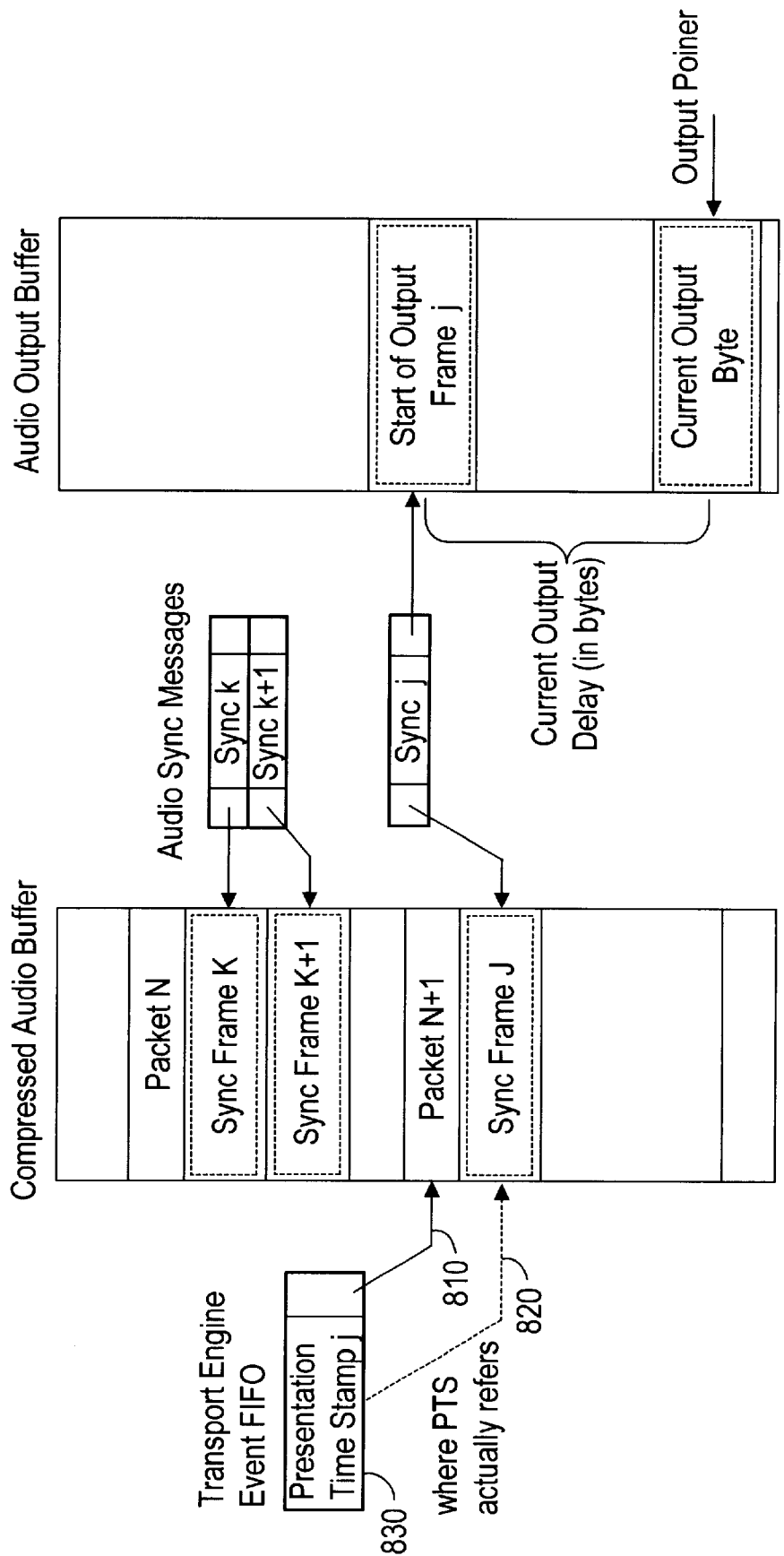
FIG. 8B is a schematic representation of how non-audio buffer pointers and tags are arranged in memory, according to one embodiment of the present invention.

Transport engine 120 tags audio presentation time stamps ("PTS") with a pointer to the first byte of the packet in which they are contained. The solid pointer 810 in FIG. 8B shows to where the address part of the TE tag points. The dashed pointer 820 shows to where the PTS actually refers. Therefore, the audio time tags cannot be used as-is for synchronization: the audio sync word must be found first. However, since the audio sync word is not a unique bit pattern, reliable sync word detection requires additional processing such as header parsing and CRC calculation, which is more effectively done by audio decoder 160 DSP.

Audio decoder 160 supplies the second and third pieces of information: where do audio sync frames start in system memory, and when is a specific sync frame presented? When the audio decoder detects a sync frame, it captures the current system memory address from which it is reading and the current system memory address to which it is writing.

In addition, the MMU and timer provides the other pieces of information: what is the time when a particular sample is being presented.

FIG. 8B shows how audio buffer pointers and tags are arranged in memory. The TE offers tags PTS(.), containing a presentation time stamp and a pointer 803. The audio decoder 160 offers pairs of compressed audio data buffer read pointers and audio output buffer write pointers named Sync(.). The MMU and timer together supply an output pointer at a certain time, together termed PT(.).

Given Sync(k), host 190 adds sync-frame-size multiples of bytes until the address is larger than the read pointer of PTS(j) and subtracts one sync frame size. The result is the address of the sync frame for the time stamp in PTS(j).

When it decodes the sync frame corresponding to PTS(j), audio decoder 160 generates a message, Sync(j), to the host 190 which lists the audio decoder's read pointer and write pointer. When host 190 processes Sync(j), it calculates the approximate presentation time, PT(j), for that sync frame by 1. taking the difference between the write pointer in Sync(j) and the current audio output read pointer;
2. multiplying the difference by the nominal uncompressed output data rate, and
3. adding to the current system time.

Host 190 compares the approximate presentation time PT(j) versus desired presentation time PTS(j) to determine whether audio decoder 160 is lagging or leading. The processor can then command audio decoder 160 to skip or repeat data as necessary, or may adjust the audio DAC frequency.

Processor Instruction Set

One embodiment of RISC-DSP audio decoder 160 provides for the following software instructions, including vector processing instructions not found in prior art RISC processors.

Although a software-implemented computer instruction is described, those skilled in the art realize that computer instructions other than those implemented in software can be used instead. Accordingly, the invention is not limited to any particular type of computer instructions.

Memory Addressing

Indirect Memory Addressing Symbols and Abbreviations

Table 18 shows the indirect memory addressing symbols and abbreviations.

TABLE 18

| | SYMBOL | ADDRESS | POST-MODIFICATION |
|---|---|---|---|
| 0 | *apn | contents of apn. (n = 0, 1, . . . , 7) | none. |
| 1 | *apn++ | contents of apn. | Byte mode: increment apn |

TABLE 18-continued

| | SYMBOL | ADDRESS | POST-MODIFICATION |
|---|---|---|---|
| | | (n = 0, 1, . . . , 7) | by 1<br>Word mode: increment apn by 2. |
| 2 | *apn-- | contents of apn. (n = 0, 1, . . . , 7) | Byte mode: decrement apn by 1<br>Word mode: decrement apn by 2. |
| 3 | *apn++ai0 | contents of apn. (n = 0, 1, . . . , 7) | new apn = old apn + ai0. |
| 4 | *apn--ai0 | contents of apn. (n = 0, 1, . . . , 7) | new apn = old apn − ai0. |
| 5 | *apn++br0 | contents of apn. (n = 0, 1, . . . , 7) | new apn = old apn + ai0, bit-reversed. |
| 6 | *apn--br0 | contents of apn. (n = 0, 1, . . . , 7) | new apn = old apn − ai0, bit-reversed. |
| 7 | *apn++ai1 | contents of apn. (n = 0, 1, . . . , 7) | new apn = old apn + ai1. |

NOTE: The content of apn is always interpreted as xbyte address. The programmer is responsible for ensuring correct xword-alignment for xword-mode memory access.

Memory Address Convention

Data memory address is always XBYTE address (includes dmem0, dmem1, cmem). Program memory address is always instruction-word address (includes pmem only). MMR registers address is always an XWORD address. There is no support for MMR byte access.

Registers

Memory Mapped Registers

The addresses shown in Table 19 are xbyte addresses. MMR access must be in xword mode, i.e., the lsb of the MMR address is always ignored.

TABLE 19

| ADDR | NAME | TYPE | WIDTH | DESCRIPTION |
|---|---|---|---|---|
| 0x0000 | FIFO_LJ | rd | 20 | read-only FIFO input, 16-bits left-justified (lsbs = 0). |
| 0x0002 | FIFO_RJ | rd | 20 | read-only FIFO input, 16-bits right-justified (msbs = 0). |
| 0x0004 | FIFO_SX | rd | 20 | read-only FIFO input, 16-bits right-justified and sign-extended. (function not implemented) |
| 0x0006 | | | | reserved. |
| 0x0008 | STAT | rd/wr | 20 | DSP status and mode control. |
| 0x000A | BITCNT | rd/wr | 5/4 | for write: FIFO bit extract block, bit count, number of bits to be extracted from the FIFO.<br>for read: bit-extract hardware status. |
| 0x000C | TOTALCNT | rd/clr | 15 | compressed data bit counter. Cleared by any write operation. |
| 0x000E | | | | reserved. |
| 0x0010 | DMAIA | rd/wr | 13 | DMA internal xbyte address for dmem0/1 access. |
| 0x0012 | DMAEA | rd/wr | 20 | DMA external dword address for SDRAM access. |
| 0x0014 | DMACNT | rd/wr | 11 | DMA transfer RISC-DSP audio decoder 160 word count. |
| 0x0016 | DMACTL | rd/wr | 10 | DMA control bits (rd/wr) and status bits (rd-only). |
| 0x0018 | CBSCTL | rd/wr | 8 | CBS FIFO control bits (rd/wr) and status bits (rd-only). |
| 0x001A | | | | |
| 0x001C | | | | |
| 0x001E | | | | |
| 0x0020 | HOST_CPR | rd | 20 | RISC-DSP audio decoder 160 Command Pointer Register (read-only). A write to this address clears the command-valid flag. |
| 0x0022 | HOST_CTL | rd | 8 | as defined in host bus section above. |
| 0x0024 | HOST_STAT | rd/wr | 20 | as defined in host bus section above. |
| 0x0026 | HOST_INTR | wr | 1 | RISC-DSP audio decoder 160-to-Host interrupt signal. A write to this address sets the interrupt bit. |
| 0x0028 | | | | |
| 0x0030 | MMU_IBRP | rd | 20 | MMU audio input buffer read pointer current value (dword address) |
| 0x0032 | MMU_OBWP | rd | 20 | MMU audio output buffer write pointer current value (dword address) |
| 0x0034 | MMU_IBLVL | rd | 16 | MMU audio input buffer level, in byte units. |

Non-accessible Registers

The following registers are not accessible by the programmer:

PC 14b program counter
IR 24b instruction register
PIR 24b previous IR
LSTART 14b loop start addr
LPEND 14b loop end addr
LRCNT 8b loop-repeat counter
PP multiplier Partial Product (inner pipeline stage).
SRCNT 8b single-repeat counter Register Address Mapping Table 20 shows register address mapping.

TABLE 20

| reg | | areg | |
|---|---|---|---|
| addr | reg | addr | areg |
| 0 | r0 | 0 | ap0 |
| 1 | r1 | 1 | ap1 |
| 2 | r2 | 2 | ap2 |
| 3 | r3 | 3 | ap3 |
| 4 | r4 | 4 | ap4 |
| 5 | r5 | 5 | ap5 |
| 6 | r6 | 6 | ap6 |
| 7 | r7 | 7 | ap7 |
| 8 | r8 | 8 | ai0 |
| 9 | r9 | 9 | ai1 |
| 10 | r10 | 10 | abase |
| 11 | r11 | 11 | amask |
| 12 | r12 | 12 | |
| 13 | r13 | 13 | |
| 14 | r14 | 14 | |
| 15 | r15 | 15 | agmode |

Branch Condition Codes

The condition code is a 5-bit value, selecting one of 32 possible branching conditions:

| | | |
|---|---|---|
| 0 | A | Always |
| 1 | Z | Zero |
| 2 | P | Positive |
| 3 | N | Negative |
| 4 | C | Carry |
| 5 | V | Overflow |
| 6 | | reserved |
| 7 | | reserved |
| 8 | F1 | Flag1 (user programmable flag) |
| 9 | VLD | FIFO Data Valid |
| 10 | EF | External Flag = CPR valid flag. |
| 11 | DB | DMA Busy |
| 12 | F2 | Flag2 (user programmable flag) |
| 13 | | reserved |
| 14 | | reserved |
| 15 | | reserved |
| 16–31 | | Nxx complement of conditions 0–15, prefix N to code (e.g., NZ is Not Zero). |

Instruction Set

RISC-DSP audio decoder 160 supports the following instructions. Table 21 shows the opcodes (i.e. the six high order bits of the 24 bit instruction) for the different types of instructions supported.

TABLE 21

| IR[23:18] | DESCRIPTION |
|---|---|
| 0000xx | nop |
| 000100 | special |
| 000101 | reserved |
| 000110 | reserved |
| 000111 | vector processing extension |
| 001xxx | control transfer |
| 010xxx | load reg immediate |
| 011xxx | reg-mem load/store |
| 1xxxxx | register arithmetic, logic, shift, mpy |

NOP: No Operation

| 23 | 22 | 21 | 20 | 19 18 17 16 15 14 13 12 11 10 9 8 7 6 5 4 3 2 1 0 |
|---|---|---|---|---|
| 0 | 0 | 0 | 0 | imm20 |

Description

No-operation, no state change except for the PC and IR.

Operands imm20: an optional 20-bit immediate data value.

Execution

PC=PC+1;

Notes

1. For register load long immediate, and arithmetic operations with long immediate data, the 20-bit immediate data word is packed into a nop instruction format (i.e., the 4 msbs are zero), and it precedes the actual instruction word. Thus no special treatment (nullification) is required in the instruction decoder and sequencer. Similarly, for branch instructions, the absolute address appears as a nop, but in this case it follows the actual instruction.

| ASSEMBLY FORMAT | | |
|---|---|---|
| nop | <imm20_value> | |
| EXAMPLES | | |
| nop | | ; no operation |
| nop | 1503 | ; |
| nop | −2 | ; |
| nop | 0xAA55F | ; |

Special Instructions

| 23 | 22 | 21 | 20 | 19 | 18 | 17 16 15 14 13 12 | 11 10 9 | 8 | 7 6 5 | 4 3 | 2 1 0 |
|---|---|---|---|---|---|---|---|---|---|---|---|
| 0 | 0 | 0 | 1 | 0 | 0 | func | | i | a2 | a1/imm4 | a0 |

Description

This is a collection of instructions for special operations, such as min, max, abs, norm functions.

Operands a0,a1,a2: reg register addresses.

I: 0=a1 is reg, 1=a1 is imm4 (4-bit unsigned immediate value).

func:

0=cond_add, conditional register add.

1=cond_sub, conditional register subtract.

2=cond_adda, conditional Acc add.

3=cond_suba, conditional Acc subtract.

4=cond_norm, conditional Acc normalize.

5–15 reserved.

Execution

0=cond_add: if (N==0) reg[a3]=reg[a0]+reg[a1];

1=cond_sub: if (N==0) reg[a3]=reg[a0]−reg[a1];

2=cond_adda: if (N==0) Acc=Acc+reg[a1].xh;

3=cond_suba: if (N==0) Acc=Acc−reg[a1].xh;

4=cond_norm: if (Acc[39]==Acc[38]) {Acc=Acc<<1; ai1++;}

Notes 1. areg operands are not allowed.
2. used for min, max, abs, and norm computations.
3. The Negative (N) flag is evaluated in the 'e' cycle of the instruction, so it contains the valid result of the previous instruction.
4. when using cond_norm, ai1 acts as the counter for the number of shift operations performed.

| ASSEMBLY FORMAT | | |
|---|---|---|
| mnemonic reg_list | | |
| EXAMPLES | | |
| cond_add | r5, r1, r3 | ; if (N==0) r5 = r1 + r3; |
| cond_sub | r5, r1, r3 | ; if (N==0) r5 = r1 − r3; |
| cond_sub | r5, r1, imm4(1) | ; if (N==0) r5 = r1 − 1; |
| cond_adda | r6 | ; one operand only |
| cond_suba | r6 | ; one operand only |
| cond_norm | | ; no operands allowed |

WARNING: The first-level Register Bypass in case of cond_add, cond_sub does not work. At least one cycle must elapse before result reuse.

Description

The Vector-Processing Extension instructions permit the use of memory array as the direct source or destination of a vector processing operation, with some pipeline latency. It is typically used for multiply-accumulate operations, in which a steady-state rate of one MAC per clock cycle is achieved. It is used in conjunction with a srpt instruction in which special control information is specified in the vpe_ctl field.

Operands a0,a1: reg or areg addresses.

amode0, amode1: indirect address post-modification mode for operand 0 and operand 1.

vpe_func:

0: vacc, vector accumulate

1: vaccn, vector accumulate negative

2: vmacc, vector mpy & accumulate

3: vmaccn, vector mpy and accumulate negative

4: vxfer, vector mem to mem xfer

5: vxfern, vector mem to mem xfer negative

6: vmap, vector modify addr ptrs.

Execution vacc: Acc=Acc+hi(*ap[a1])

vaccn: Acc=Acc−hi(*ap[a1])

vmacc: P=*ap[a0]* *ap[a1], Acc=Acc+P vmaccn: P=*ap[a0]* *ap[a1], Acc=Acc−P vxfer: *ap[a0]=Acc+hi(*ap[a1])

vxfern: *ap[a0]=Acc−hi(*ap[a1])

vmap: modify ap[a0], ap[a1]

Notes 1. used for vector processing, typically from memory to Acc.
2. The memory arrays accessed by the VPE instructions are not specified in the instruction. The src0/dest (left operand) can be dmem0 or dmem1. The src1 (right operand) can be dmem0, dmem1, or cmem. Memory array selection is done by programming the AGMODE register.
3. all memory access is in word mode only.
4. due to additional pipeline delay in accessing memories, special handling is required. For more information, see programming notes below, as well as description of the vpe_ctl field in the srpt instruction.

| Vector Processing Extension Instructions | | | | | | | | | | | | | | | | | | | | | | | |
|---|---|---|---|---|---|---|---|---|---|---|---|---|---|---|---|---|---|---|---|---|---|---|---|
| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 1 | 1 | 1 | vpe_func | | | | | amode0 | | | amode1 | | | a1 | | | a0 | | | |

| ASSEMBLY FORMAT | |
|---|---|
| vacc | *ap |
| vaccn | *ap |
| vmacc | *ap0, *ap1 |
| vmaccn | *ap0, *ap1 |

-continued

```
        vxfer    *ap0, *ap1
        vxfern   *ap0, *ap1
        vmap     *ap0, *ap1
    EXAMPLES
        vmacc    *ap3++ai1, *ap1--
        vmap     *ap3++, *ap1--br0
```

BREL(D): Branch Relative (Delayed)

| 23 | 22 | 21 | 20 | 19 | 18 | 17 16 15 14 13 | 12 | 11 10 9 8 7 6 5 4 3 2 1 0 |
|----|----|----|----|----|----|----|----|----|
| 0 | 0 | 1 | 0 | 0 | 0 | cond | d | addr |

Description

The brel and breld are conditional branch instructions, specifying a target branch address as an offset relative to the current PC. A branch not taken takes 1 clock cycle to execute. Due to the pipelined nature of execution, a branch taken incurs a 2-clock penalty, for a total execution time of 3 clocks. A delayed branch taken has no such penalty, since the 2 instructions in the delay slots are always executed, independent of the branch condition.

Operands
- cond: 5-bit condition code
- d: 0=normal, 1=delayed branch
- addr: a 12-bit signed value, address displacement relative to the current PC in the 'e' cycle.

Execution
- if (cond code) PC=PC+addr, else PC=PC+1.

Notes
1. Program Memory address is word-oriented.
2. the addr field is a displacement relative to the current PC in the 'e' cycle, which is PC+2 relative to the PC that points to the BREL instruction.
3. BREL has 2 delay slots that are nullified if the branch is taken. In case of BRELD (delayed BREL), the two delay slots are not nullified; i.e., the 2 instructions following BRELD are executed prior to the branch.
4. instructions in the delay slots of BRELD must not be control transfer or repeat operations.

```
ASSEMBLY FORMAT
    brel(d) condition, address_offset    ;
EXAMPLES
    brel z, label1                       ; label1 must be within range
    breld nn, label2
```

JUMP(D): Jump Absolute (Delayed)

| 23 | 22 | 21 | 20 | 19 | 18 | 17 16 15 14 13 | 12 | 11 10 9 8 7 6 5 4 3 2 1 0 |
|----|----|----|----|----|----|----|----|----|
| 0 | 0 | 1 | 0 | 0 | 1 | cond | d | |
| | | | | | | | | addr |

Description

The jump and jumpd are conditional branch instructions, specifying a target branch address as an absolute address. It is a 2-word instruction. A branch not taken takes 2 cycles to execute. Due to the pipelined nature of execution, a branch taken incurs a 1-clock penalty, for a total execution time of 3 clocks. A delayed branch taken has no penalty, since the instruction in the delay slot is always executed, independent of the branch condition.

Operands
- cond: 5-bit condition code
- d: 0=normal, 1=delayed branch
- addr: an absolute jump address.

Execution
- if (cond code) PC=addr, else PC=PC+1.

Notes
1. Program Memory address is word-oriented.
2. JUMP is a 2-word instruction.
3. JUMP has 1 delay slot that is nullified if the branch is taken. In case of JUMPD (delayed JUMP), the delay slot is not nullified; i.e., the instruction following JUMPD is executed prior to the branch.
4. instructions in the delay slots of JUMPD must not be control transfer or repeat operations.

```
ASSEMBLY FORMAT
    jump(d) condition, absolute_address   ;
EXAMPLES
    jump z, label1      ;
    jumpd nn, label2    ;
```

-continued

CALLR(D): Call Relative (Delayed)

| 23 | 22 | 21 | 20 | 19 | 18 | 17 16 15 14 13 | 12 | 11 10 9 8 7 6 5 4 3 2 1 0 |
|----|----|----|----|----|----|----|----|----|
| 0 | 0 | 1 | 0 | 1 | 0 | cond | d | addr |

Operands
   cond: 5-bit condition code
   d: 0=normal, 1=delayed branch
   addr: a 12-bit signed value, address displacement relative to the current PC in the 'e' cycle.

Execution
   normal: if (cond code) {PC=PC+addr, TOS=PC+1} else PC=PC+1.
   delayed: if (cond code) {PC=PC+addr, TOS=PC+3} else PC=PC+1.

Notes
1. Program Memory address is word-oriented.
2. the addr field is a displacement relative to the current PC in the 'e' cycle, which is PC+2 relative to the PC that points to the CALLR instruction.
3. CALLR has 2 delay slots that are nullified if the branch is taken. In case of CALLRD (delayed CALLR), the two delay slots are not nullified; i.e., the 2 instructions following CALLRD are executed prior to the branch, and the return address is PC+3.
4. instructions in the delay slots of BRELD must not be control transfer or repeat operations.

Operands
   cond: 5-bit condition code
   d: 0=normal, 1=delayed branch
   addr: an absolute jump address.

Execution
   normal: if (cond code) {PC=addr, TOS=PC+2} else PC=PC+1.
   delayed: if (cond code) {PC=addr, TOS=PC+3} else PC=PC+1.

Assembly Format
   call(d) condition, absolute_address

Notes
1. Program Memory address is word-oriented.
2. CALL is a 2-word instruction.
3. CALL has 1 delay slot that is nullified if the branch is taken. In case of CALLD (delayed CALL), the delay slot is not nullified; i.e., the instruction following CALLD is executed prior to the call, and the return address is PC+3.
4. instructions in the delay slots of CALLD must not be control transfer or repeat operations.

ASSEMBLY FORMAT
   callr(d) condition, relative_address

EXAMPLES
   callr z, label1       ;label1 must be within range
   callrd nn, label2

CALL(D): Call Absolute (Delayed)

| 23 | 22 | 21 | 20 | 19 | 18 | 17 16 15 14 13 | 12 | 11 10 9 8 7 6 5 4 3 2 1 0 |
|----|----|----|----|----|----|----|----|----|
| 0 | 0 | 1 | 0 | 1 | 1 | cond | d | |
| | | | | | | | | addr |

EXAMPLES
   call z, label1    ;
   calld nn, label2   ;

RET(D): Return (Delayed)

| 23 | 22 | 21 | 20 | 19 | 18 | 17 16 15 14 13 | 12 | 11 10 9 8 7 6 5 4 3 2 1 0 |
|----|----|----|----|----|----|----|----|----|
| 0 | 0 | 1 | 1 | 0 | 0 | cond | d | |

Operands
  cond: 5-bit condition code
  d: 0=normal, 1=delayed.
Execution
  if (cond code) PC=TOS, else PC=PC+1.
Notes
  1. Program Memory address is word-oriented.
  2. RET has 2 delay slots that are nullified if the branch is taken. In case of RETD (delayed RET), the delay slots are not nullified; i.e., the 2 instructions following RETD are executed prior to the return.
  3. instructions in the delay slots of RETD must not be control transfer or repeat operations.

```
ASSEMBLY FORMAT
    ret(d) condition
EXAMPLES
    ret a         ;
    retd z        ;
SRPT: Single Repeat
```

| 23 | 22 | 21 | 20 | 19 | 18 | 17 16 15 14 13 | 12 | 11 10 9 8 7 6 5 4 | 3 2 1 0 |
|----|----|----|----|----|----|----------------|----|-------------------|---------|
| 0  | 0  | 1  | 1  | 0  | 1  | cond           | i  | src/imm8          | vpe_ctl |

Operands
  cond: 5-bit condition code, must be 16.
  i: 0=reg, 1=imm8.
  src/imm8: if i=0, indicate src reg; if i=1, it is an 8-bit unsigned immediate repeat count.
  vpe_ctl: vector-processing extension control word. Must be zero for all non-VPE operations.
    0=normal (non-VPE) operation.
    1=enable Acc initialization using rnd in the 5th cycle, for vmacc/vmaccn.
    2=enable Acc initialization using rnd in the 3rd cycle, for vacc/vaccn.
    3=disable dmem0/dmem1 write in the first 2 cycles, for vxfer/vxfern.
    4–15=reserved.
Execution
  The 2nd instruction following srpt is executed n times. The single repeat instruction has the following restrictions:
    cannot be placed in the delay slots of control transfer (jump, branch, call, return).
    the repeated instruction is separated from SRPT by one instruction, which can be a NOP or any non ctl-xfr single-word instruction.
    the instruction is executed n times.
    the minimum value of n is 1 (execute once).
    the maximum value of n is 256 (execute 256 times, 8-bit count initialized to 0).
    the repeated instruction must be a single-word, non-ctl-xfr instruction.
Notes
  1. Conditional execution is NOT supported, cond must be 16.
  2. areg as a src register is not allowed.
  3. For more information see programming notes below.

```
ASSEMBLY FORMAT
    srpt rn, vpe_ctl
    srpt imm8, vpe_ctl
EXAMPLES
    srpt r5, 0              ; srpt_cnt=r5, vpe_ctl=0
    nop                     ; not repeated
    add Acc, r2.xh, r4.xh   ; exectued n times
    srpt 137, 0             ; srpt_cnt=137, vpe_ctl=0
    nop                     ; not repeated
    add Acc, r2.xh, r4.xh   ; executed 137 times
LRPT: Loop Repeat
```

-continued

| 23 22 21 20 19 18 | 17 16 15 14 13 | 12 | 11 10 9 8 7 6 5 4 | 3 2 1 0 |
|-------------------|----------------|----|-------------------|---------|
| 0 0 1 1 1 0       | cond           | i  | src/imm8          | vpe_ctl |
|                   |                |    | addr              |         |

Operands
  cond: 5-bit condition code, must be 16.
  i: 0=reg, 1=imm8.
  src/imm8: if i=0, indicate src reg; if i=1, it is an 8-bit unsigned immediate repeat count.
  vpe_ctl: vector-processing extension control word, TBD.
  addr: address of the last word of the last instruction inside the repeat loop.
Execution
  The instructions between LRPT and addr (inclusive) are executed n times. LRPT allows zero-overhead looping, i.e., it allows repeating a segment of code up to 256 times without branch and loop end checking overhead. The loop repeat instruction has the following restrictions:
    there must be at least two 1-word or one 2-word instructions in the loop.
    the loop is executed n times.
    the minimum value of n is 1 (execute once).
    the maximum value of n is 256 (execute 256 times, 8-bit count initialized to 0).
    the last 3 instructions in the loop cannot be SRPT, SRPT target, or ctl-xfr type.
    hardware loops cannot be nested.
Notes
  1. Conditional execution is NOT supported, cond must be 16.
  2. areg as a src register is not allowed.

```
ASSEMBLY FORMAT
    lrpt rn, address, vpe_ctl
    lrpt imm8, address, vpe_ctl
EXAMPLES
        lrpt r5, loop1, 0       ; lrpt_cnt=r5, vpe_ctl=0
        add r1, r1, r3
loop1:  add r1, r1, r4
        lrpt 137, loop2, 1      ; lrpt_cnt=137, vpe_ctl=1
        add r1, r1,r2
        add r1, r1,r4
loop2:  add r1, r1,r3
```

JREG(D): Jump Register (Delayed)

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 0 | 1 | 1 | 1 | 1 | cond | | | | | d | | | | | | | | | a0 | | | |

Operands cond: 5-bit condition code d: 0=normal, 1=delayed branch a0: addr of reg containing the target jump address.

Execution if (cond code) PC=reg[a0], else PC=PC+1.

Notes

1. Program Memory address is 24-bit word-oriented.
2. JREG has 2 delay slots that are nullified if the branch is taken. In case of JREGD (delayed JREG), the two delay slots are not nullified; i.e., the 2 instructions following JREGD are executed prior to the branch.
3. instructions in the delay slots of JREGD must not be control transfer or repeat operations.
4. areg as a src register is not allowed.

```
ASSEMBLY FORMAT
    jreg(d) condition, rn
EXAMPLES
    jreg z, r5          ;
    jregd nn, r1        ;
```

LSDI, LDLI: Load Reg/Areg Short/Long Immediate

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 1 | 0 | L | type | | a | | | imm13 | | | | | | | | | | | a0 | | | |

Operands

L: 0=short , 1=long immediate type: for short only: 0=unsigned, 1=signed, 2=setbit(n) where n=0–15, 3=reserved.

a: 0=reg load (r0–r15), 1=areg load (ap0–ap7, ai0, ai1, amask, abase, agmode).

imm13: if L=0, this 13-bit value is modified by type and loaded into reg[r0] or areg[r0].

if L=1, imm13 is unused, and the previous program word contains a full 20-bit immediate value.

a0: address of the register to be loaded

Execution if (a==0) reg[a0]=immediate_data;

else areg[a0]=immediate_data;

Notes

1. For long immediate, the immediate data word precedes the load instruction, and, since its 4 msbs are zero, it is automatically treated as nop.
2. For bitset, only the range 0–15 is supported.

```
ASSEMBLY FORMAT
    ldli [reg,areg], long_imm_value
    ldsi [reg,areg], imm_value <, mode>
    valid modes are:
        us      unsigned (default)
        s       signed
        bs      setbit(n)
EXAMPLES
    ldsi r1, 0x1FFF         ; short immediate
                              unsigned: r1 = 0x01FFF.
    ldsi r1, 0x1FFF, us     ; short immediate
                              unsigned: r1 = 0x01FFF.
    ldsi r1, 0x1FFF, s      ; short immediate signed:
                              r1 = 0xFFFFF.
    ldli r2, 0xABCDE        ; long immediate: r2 =
                              0xABCDE.
    ldsi r3, 7, bs          ; short immediate bitset:
                              r3 = 1 << 7.
    ldsi r3, bitset(7)      ; short immediate bitset:
                              r3 = 1 << 7.
    ldsi ap2, 0, us         ; areg load
    ldli abase, 0x1234      ; areg load long
                              immediate
```

Memory-Register Load/Store

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | 1 | 1 | 1s | m | 0 | a | w | mem | | | | addr | | | | | | | | a0 | | | |
| 0 | 1 | 1 | 1s | m | 1 | a | w | mem | | | | amode | | | | | | aptr | | | a0 | | |

Operands

1s: 0=load reg from mem , 1=store reg to mem m: 0=memory, 1=mmr.

a: 0=reg load/store (r0–r15), 1=areg load/store (ap0–ap7, ai0,ai1,amask,abase,agmode).

w: 0=byte, 1=word mem: 0=dmem0, 1=dmem1, 2=cmem, 3=reserved.

addr (direct addressing only): memory/mmr address.

if w=0 (byte mode) addr contains bits [9:0] of the byte address to be accessed.

if w=1 (word mode) addr contains bits[10:1] of the byte address to be accessed.

aptr (indirect addressing only): address pointer used.

amode (indirect addressing only): address post-modification mode.

a0: address of the register operand.

Execution

LOAD: areg/reg[a0]=memory_data;

STORE: memory=areg/reg[a0];

Notes

1. Memory address is byte-oriented.
2. Memory access in word mode must be word-aligned.
3. The upper bit(s) of the addr come from the page pointer in the status register. In the case of byte access, bits [11:10] come from the page pointer. In the case of word access, bit [11] comes from the page pointer.
4. dmem0 is the default memory to be accessed.
5. There is no register bypass associated with memory-to-register transfer. Two clock cycles must elapse before register reuse as source operand.

```
ASSEMBLY FORMAT
    ldmw [reg,areg], address, <mem>
    ldmb [reg,areg], address, <mem>
    stmw [reg,areg], address, <mem>
```

-continued

```
       stmb [reg,areg], address, <mem>
       NOTE: In case of direct addressing using a
symbolic label for dmem0, dmem1, and mmr, mem need not be
specified. The assembler will select the right memory
array based on the label.
EXAMPLES
       ldmw r0, LABEL1            ; word , dmem0 or dmem1
       ldmw r0, LABEL1            ; word , dmem0 or dmem1
       ldmb r1, LABEL2            ; byte, dmem0
       ldmw r2, LABEL3, cmem         ; word, cmem
       ldmw r3, status            ; mmr, word
       ldmw ap0, LABEL5           ; areg-mem
       ldmw r0, *ap1, dmem0       ; indirect
       ldmw r0, *ap2++, dmem1        ; indirect w post-incr
       stmw r2, LABEL6            ; store r2 to dmem0, word,
       stmb r2, LABEL6            ; store r2 to dmem0, byte
       stmw r0, *ap2++, dmem1        ; indirect w post-incr
       SLAM: Shift-Logic-Add-Multiply
```

| 23 | 22 21 | 20 | 19 18 17 16 | 15 14 13 12 | 11 10 9 8 | 7 6 5 4 | 3 2 1 0 |
|----|-------|----|-------------|-------------|-----------|---------|---------|
| 1  | op    | m  | type        | func        | a2/subfunc| a1/imm4 | a0      |
| 1  | op    | m  | type        | func        | imm8      |         | a0      | b[23]=1

1 indicate SLAM instruction b[22:21]=op, which selects one of 4 operations:

0=add

1=add with carry

2=shift

3=logic b[20]=m

0=disable, 1=enable multiplier operation.

b[19:16]=type

The type field selects one of 16 types of SLAM operations as described below. The multiply part of the description is applicable only if m=1. Note that the source operand order is significant and cannot be swapped.

0: r2=r0 op r1, P=PP, PP=junk; 3-op, reg.

1: areg=r0 op r1, P=PP, PP=junk; 3-op, areg as dest

2: r2=areg op r1, P=PP, PP=junk; 3-op, areg as src0

3: r0=r0 op r1, P=PP, PP=junk ; 2-op, reg

4: r0=r0 op P , P=PP, PP=junk ; 2-op

5: r0=Acc op r1, P=PP, PP=junk; 2-op

6: r2=Acc op P, P=PP, PP=r0*r1; 3-op, MAC

7: r0=rnd op r1, P=PP, PP=junk; 2-op

8: r2=rnd op P, P=PP, PP=r0*r1; 3-op, MAC

9: Acc=r0 op r1, P=PP, PP=junk;

a: Acc=r0 op P , P=PP, PP=junk;

b: Acc=Acc op r1, P=PP, PP=junk;

c: Acc=Acc op P, P=PP, PP=r0*r1; MAC d: Acc=rnd op r1, P=PP, PP=junk;

e: Acc=rnd op P, P=PP, PP=r0*r1; MAC f: nop, P=PP, PP=r0*r1; MPY

Notes 1. the first source operand is referred to as src0, the second operand is src1, and the destination operand is referred to as dest.
2. If all 3 operands are single-precision (type 0,1,2,3), the ALU operation takes place in the low word (bits [19:0]) of the datapath, and the destination is derived from the low word of the datapath.
3. If one (or both) of the source operands is double-precision (Acc, P, or rnd) and the destination is single-precision (reg), the destination is derived from the high word (bits [39:20]) of the datapath.
4. Whenever double-precision operands (Acc, P, rnd) are mixed with reg operands, the register extension mode must be appended to any reg source operand, e.g.: r1.xh, r1.xl, etc.
5. rnd is a read-only double-precision value, and can appear only as the first source operand.
6. Acc may be used only as the first source operand, or as a destination operand.
7. P may appear only as the second source operand, and it is the implicit destination operand of a mpy operation.
8. Add with carry may be used only when both source operands are reg/areg.
9. Reverse-subtract with borrow is not supported.
10. For long immediate, the immediate data word precedes the SLAM instruction, and, since its 4 msbs are zero, the long-immediate data is automatically treated as a nop instruction.
11. areg may appear only as src0 (in slam type 2) or dest (in slam type 1) operand.
12. 4-bit unsigned immediate value (imm4) can replace r1 as the src1 operand in all types except types 4,10.
13. 4-bit bitset immediate value can replace r1 as the src1 operand in all types except types 0,1,2,4,6,8,10. Available for add and logic, not available for shift.
14. 8-bit unsigned immediate value (imm8) can replace r1 as the src1 operand in all types except types 0,1,2,4,6, 8,10. Some functionality is lost when using imm8, since the subfunc field is not available; e.g., test/compare operation cannot be done.
15. 20-bit signed immediate value (imm20) can replace r1 as the src1 operand in all types except types 4,10. When used, the 20-bit immediate value is packed into a nop instruction which precedes the slam instruction, effectively making the slam a 2-word, 2-cycle operation. imm20 is not available for shift.
16. A test/compare operation is a SLAM operation that does not store the result; it only affects the condition-codes. A test/compare may be used in all types except types 0,1,2,6,8, or when imm8 is used.

Add, Add with Carry b[15:12]=func for add, add with carry b[15:14]: 0=reg, 1=imm8, 2=imm4, 3=imm20 (long)

b[13:12]:

0=add op0+op1

1=subtract op0−op1

2=reverse subtract−op0+op1

3=reserved.

b[11:8]=subfunc for add, add with carry (not available for 3-op, imm8)

b[11]: 0=test/compare (no dest load), 1=normal (default for 3-op, imm8).

b[10:9]: Alignment select:

0=Hi op Hi (default for 3-op, imm8)

1=Hi op Lo_sx

2=Hi op Lo_zf

3=Lo_sx op Lo_sx

Legend

Hi=the single-precision operand is placed in bits[39:20] of the 44-bit bus, sign-extended.

Lo_sx=the single-precision operand is placed in bits [19:0] of the 44-bit bus, sign-extended.

Lo_zf=the single-precision operand is placed in bits [19:0] of the 44-bit bus, unsigned.

b[8]: if imm4: 0=raw data (default for 3-op, imm8), 1=bitset(n).

Assembly Format afunc: dest, op0, op1<, mpy, mop0, mop1> dest: [reg, areg, Acc, test]

op0: [reg, areg, reg.x, Acc, rnd]

op1: [reg, reg.x, P, imm4, imm4.x, bitset, bitset.x imm8, imm8.x, imm20, imm20.x]

mop0: [reg]

mop1: [reg]

afunc: add/mpy functions:

mpy: multiply only add: add addc: add with carry sub: subtract subb: subtract with borrow rsub: reverse subtract Examples

| | | |
|---|---|---|
| add | r3, r5, r1 | ; type 0 |
| add | r3, r5, imm4(11) | ; type 0 imm4 |
| add | r0, r0, bitset(5) | ; type 0 imm4 bitset |
| add | r3, r5, imm20(0xABCDE) | ; type 0 imm20 |
| add | ap2, r4, r1 | ; type 1 |
| add | r7, ap0, r2 | ; type 2 |
| add | r5, r5, r6 | ; type 3 |
| add | r5, r5, imm8(176) | ; type 3 imm8 |
| add | test, r6, imm4(1) | ; type 3 test, imm4 |
| add | r2, r2.xh, p | ; type 4, high |
| add | r1, Acc, r6.xlu | ; type 5 low unsigned |
| add | r7, Acc, p, mpy, r3, r4 | ; type 6, with mpy |
| add | r0, rnd, r6.xh | ; type 7 |
| add | r7, rnd, p, mpy, r3, r4 | ; type 8, with mpy |
| add | Acc, r5.xh, r6.xl | ; type 9 |
| add | Acc, r5.xh, imm4(3).xl | ; type 9, imm4, xl |
| add | Acc, r5.xh, p | ; type a |
| add | Acc, Acc, r1.xl | ; type b low |
| add | Acc, Acc, r1.xlu | ; type b low unsigned |
| add | Acc, Acc, r1.xh | ; type b high |
| add | Acc, Acc, p | ; type c, no mpy |
| add | Acc, Acc, p, mpy, r0, r1 | ; type c, with mpy |
| add | Acc, rnd, r0.xlh | ; type d |
| add | Acc, rnd, p, mpy, r0, r1 | ; type e, with mpy |
| mpy | r0, r1 | ; type f — must be with multiply |

The following 2 instructions are equivalent:

| | |
|---|---|
| mac | r0, r1 |
| add | Acc, Acc, P, mpy, r0, r1 |

Shift b[15:12]=func for shift b[15]: 0=reg, 1=imm4.

b[14]: 0=left, 1=right.

b[13]: 0=arithmetic, 1=logical b[12]: 0=no saturation, 1=enable saturation.

b[11:8]=subfunc for shift (not available for 3-op)

b[11]: 0=test/compare (no dest load), 1=normal.

b[10:9]:

0=Hi op Hi

1=Hi op Lo_sx

2=Hi op Lo_zf

3=Lo_sx op Lo_sx b[8]: 0=disable, 1=enable 'one' shift-left fill if (N==0), for div step.

Notes 1. not all op types are usable for shift. The usable types are: 0,1,2,3,5,9,11.
2. imm8 is not supported for shift.
3. Shift range is 0–31 in either direction. Note that when using imm4 value, the maximum range that can be specified is 0–15.
4. for all 3-op cases, the sub-func is forced to zero, thereby allowing only a subset of the full functionality for 3-op instructions (no div step, no test, Hi-op-Hi only).

Shift Functions:

shl shift left (arithmetic)

shr shift right arithmetic shrl shift right logical shlf shift left with '1' fill if (N==0).

| ASSEMBLY FORMAT | | |
|---|---|---|
| sfunc dest, op0, op1 <, sat> <, mpy> | | |
| EXAMPLES | | |
| shl | r3, r5, r1 | ; type 0 |
| shl | r3, r5, r1, sat | ; type 0 with sat |
| shl | r3, r5, imm4(11) | ; type 0 imm4 |
| shr | ap2, r4, r1 | ; type 1 |
| shrl | r7, ap0, imm4(2) | ; type 2 |
| shlf | r5, r5, imm4(1) | ; type 3 |
| shl | r1, Acc, r6 | ; type 5 |
| shr | Acc, r5.xh, r6 | ; type 9 |
| shl | Acc, Acc, r1 | ; type b |
| shl | Acc, Acc, imm4(1), mpy | ; type b w mpy |

Logic Functions b[15:12]=func for logic b[15:14]: 0=reg, 1=imm8, 2=imm4, 3=imm20 (long).

b[13:12]: logic func select bits—lfunc[1:0].

b[11:8]=subfunc for logic (not available for 3-op, imm8)

b[11]: 0=test/compare (no dest load), 1=normal.

b[10:9]: logic func select bits—lfunc[3:2].

b[8]: if imm4: 0=raw data, 1=bitset(n).

Logic function select field—lfunc[3:0]:

0: and: out=r0 and r1

1: iand: out=r0 and ~r1

2: or: out=r0 or r1

3: xor: out=r0 xor r1

4: inv0: out=~r0

5: inv1: out=~r1

6: pass0: out=r0

7: pass1: out=r1

8: nibble: out=nibble(r1) of r0; (r1=0,1,2,3.)

9: swap: out=ByteSwap(r1);

10: swapc: if (sc==1) out=ByteSwap(r1), else out=r1;

11–15: reserved.

Notes 1. for all 3-op and imm8 cases, the sub-func is forced to zero, thereby allowing only a subset of the full functionality for 3-op instructions (no bitset, no test, lfunc= and, iand, or, xor only).
2. the inv0, inv1, pass0, pass1, nibble, swap, and swapc instructions are 2-operand instructions only.
3. since the logic unit is only 20-bit wide (single precision), double-precision source operand alignment is not implemented. It is hard wired to Hi-Hi. The 20-bit result appears in the Hi word of the 44-bit ALU output.

4. the 20-bit logic operation is extended to 24 bits for correct condition flag generation.
5. the ByteSwap ( ) function swaps bits[7:0] and bits [15:8] of the input, and then sign extends the new bit[15] into the remaining 4 most significant bits.
6. the swapc instruction is a conditional byte swapping, controlled by the sc bit in the status register.

ASSEMBLY FORMAT lfunc dest, op0, op1 <, mpy>

EXAMPLES

| | | |
|---|---|---|
| nibble | r4, r4, r1 | |
| nibble | r4, r4, imm4(2) | |
| swap | r2, r5 | ; type 3 |
| swap | r2, p | ; type 4 |
| swapc | r2, r5 | ; type 3 |
| swapc | r2, p | ; type 4 |
| and | r3, r5, r1 | ; type 0 |
| iand | r3, r5, imm4(11) | ; type 0 imm4 |
| or | r3, r5, imm20(0xABCDE) | ; type 0 imm20 |
| xor | ap2, r4, r1 | ; type 1 |
| and | r7, ap0, r2 | ; type 2 |
| and | r5, r5, r6 | ; type 3 |
| and | r5, r5, imm8(176) | ; type 3 imm8 |
| and | test, r6, imm4(1) | ; type 3 test, imm4 |
| and | r5, r5, bitset(5) | ; type 3 bitset |
| and | r2, r2.xh, p | ; type 4, high |
| and | r1, Acc, r6.xlu | ; type 5 low unsigned |
| and | r7, Acc, p, mpy, r3, r4 | ; type 6, with mpy |
| and | r0 rnd r6.xh | ; type 7 |
| and | r7, rnd, p, mpy, r3, r4 | ; type 8, with mpy |
| and | Acc, r5.xh, r6.xl | ; type 9 |
| and | Acc r5.xh, p | ; type a |
| and | Acc, Acc, r1.xl | ; type b low |
| and | Acc, Acc, r1.xlu | ; type b low unsigned |
| and | Acc, Acc, r1.xh | ; type b high |
| and | Acc, Acc, p | ; type c, no mpy |
| and | Acc, Acc, p, mpy, r0, r1 | ; type c, with mpy |
| and | Acc, rnd, r0.xlh | ; type d |
| and | Acc, rnd, p, mpy, r0, r1 | ; type e, with mpy |

Arithmetic/Logic Condition Flags

Zero

ARITHMETIC: 1=adder output bits[43:0] are all zero.
LOGIC: 1=logic unit output bits[19:0] are all zero.
SHIFT: 1=shifter output bits[43:0] are all zero.

Negative

ARITHMETIC: 1=adder output bit[43]=1
LOGIC: 1=logic unit output bit[19]=1.
SHIFT: 1=shifter output bit[43]=1.

Carry

ARITHMETIC: 1=carry out from bit[19] of adder is 1.
LOGIC: does not affect carry.
SHIFT: does not affect carry.

Overflow

ARITHMETIC: 1=overflow condition of bits[19:0] of adder is 1.
LOGIC: does not affect overflow.
SHIFT: does not affect overflow.

WARNING: Since some condition flags are associated with the full 44-bit ALU output, the flag may not accurately represent the content of a destination register. As an example, if r2=0x80000 and we execute r2=r2<<1

After execution, r2=0, but the Zero flag is not set, because the 44-bit shifter output is non zero.

The Zero and Negative flags are valid for all arithmetic, shift, and logic operations.

The Overflow and Carry flags are valid only for single-precision arithmetic (add, sub) operations, in which both source and destination operands are single-precision (20-bit) registers.

Modes of Operation

The RISC-DSP audio decoder 160 supports two high level modes of operation, free-running mode and slave coprocessor mode.

In Free-Running Mode, RISC-DSP audio decoder 160 decodes an audio frame as soon as the amount of data in input buffer 142 (referring to FIG. 2) has reached a programmable threshold level. RISC-DSP audio decoder 160 does not require a new host command every frame. In steady state, very little is required of Host 190, except for occasional synchronization adjustments. Such adjustments are typically in the form of decode commands indicating sample skip/repeat. RISC-DSP audio decoder 160 operation is regulated by the levels of input buffer 142 and output buffer 144. If input buffer 142 is too low, RISC-DSP audio decoder 160 will wait. Similarly, if output buffer 144 is full, RISC-DSP audio decoder 160 will wait. Host 190 should regularly check the I/O buffer levels and RISC-DSP audio decoder 160 messages, and issue skip/repeat commands as necessary.

Sync-Found messages are generated every frame (MPEG, AC-3), or every 20 frames (PCM). The maximum rate of Sync-Found messages is 42 messages per second for MPEG or 32 messages per second for AC-3 and PCM. In PCM mode, since there are no syncwords, RISC-DSP audio decoder 160 artificially generates a Sync-Found message every 32 msec (20 PCM frames). Command Acknowledge and Command-Completion messages are generated in response to commands. Error detection messages are generated if errors are encountered.

In Slave Coprocessor Mode, RISC-DSP audio decoder 160 waits for a command from Host 190. A new command is required for every frame (or a number of frames) to be decoded. Upon task completion, RISC-DSP audio decoder 160 notifies Host 190 via a message and optional interrupt, and then idles until another command is received.

Sync-Found messages are generated the same way as in the Free-Running Mode discussed above. A Command Acknowledge message is generated upon receiving the command, indicating that CPR is available for the next command. A Command-Completion message is generated at the end of each command and is accompanied by a return-code that may indicate error detection. Separate error detection messages are not generated.

Architectural Element Details

Program Memory

The program memory (pmem) 230 is a 24-bit-wide ROM containing all code. Estimated pmem size is 5000 instructions for AC-3 (including Pro Logic decode) and 2000 instructions for MPEG. Thus, the estimated total size is 7000 by 24 bits.

On-Board Data Memories

There are three data memory arrays within the RISC-DSP decoder: dmem0 250, dmem1 260 and cmem 280.

Array dmem0 250 is a 20-bit dual-port (one read, one write) RAM, with 10-bit-xbyte addressibility. It is used mainly for variables, control flags, and storage of bitstream information, values which typically require 16 bits or less. Maximum dmem0 size is 4 Kbytes (two 1024 by 20 bit arrays).

Array dmem1 260 is a 20-bit dual-port (one read, one write) RAM (no byte access support). It is used mainly for audio samples storage and processing, which requires at least 20 bits to achieve full compliance. Maximum dmem1 size is 4 Kbytes (two 1024 by 20 bit arrays).

Array cmem 280 is a 20-bit ROM, with 10-bit-xbyte addressibility. It is used to store MPEG and AC-3 constants and tables. Maximum cmem size is 8 Kbytes (four 1024 by 20 bit arrays). Note that MPEG-1 and -2 require about 1500 20-bit locations, while Dolby AC-3 (including Pro Logic decode) requires about 2000 20-bit locations.

Datapath

Figure 9:
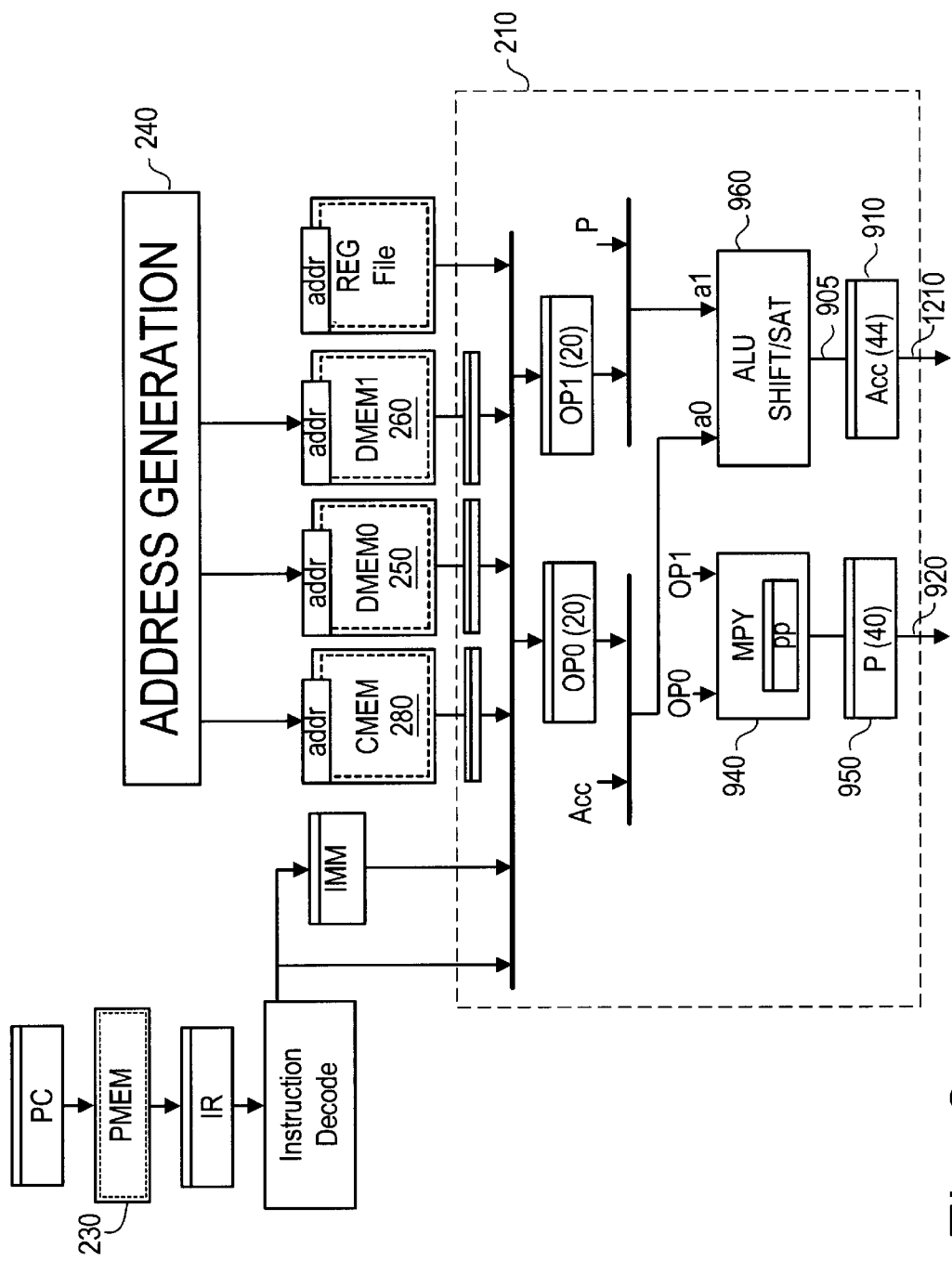
FIG. 9 is a block diagram of one embodiment of the datapath of the invention and its interfaces.
Figure 12:
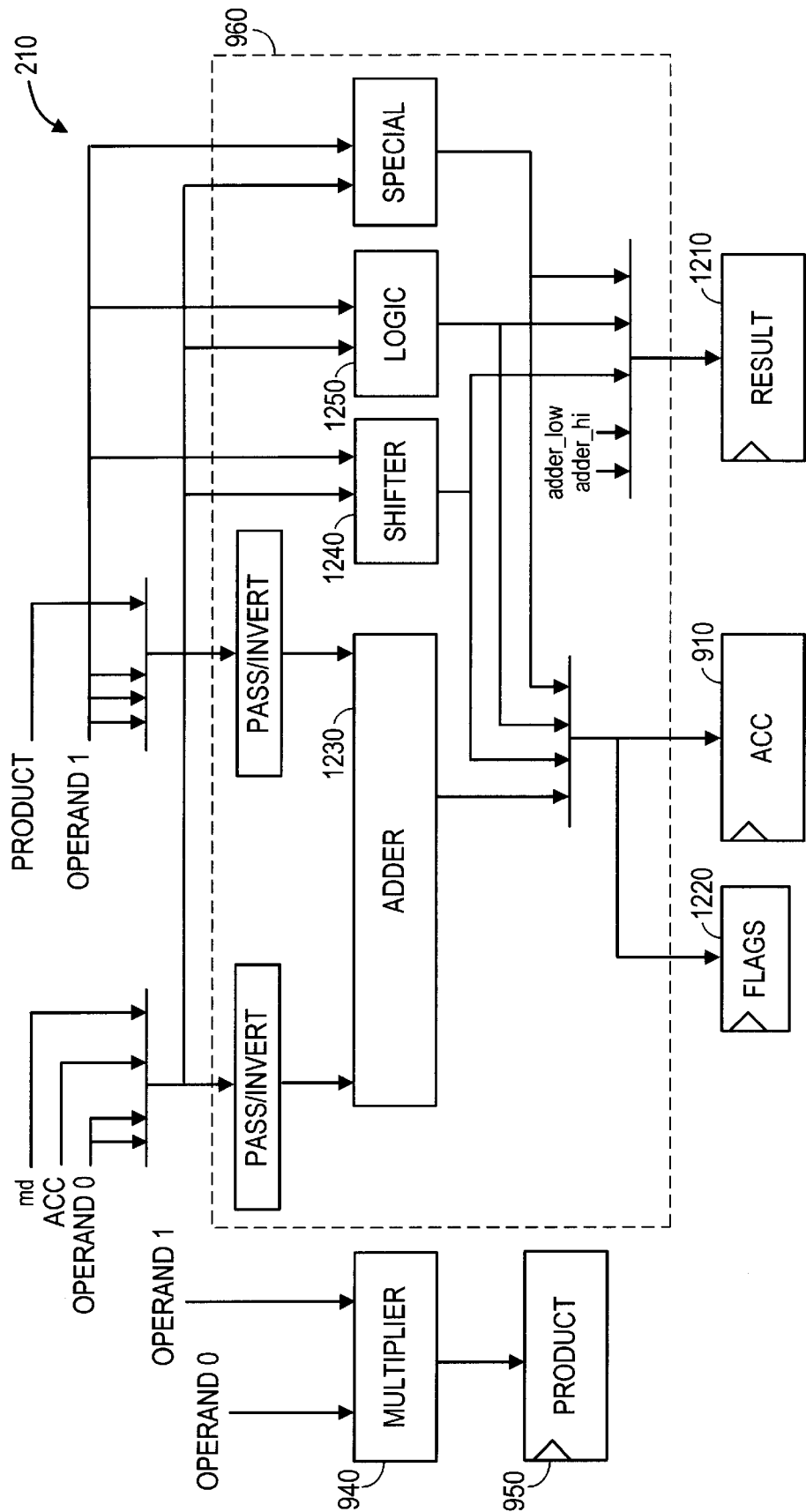
FIG. 12 is a detailed block diagram of one embodiment of the datapath.

An arithmetic datapath output 905 is provided from the multiplexed output of the adder, shifter/saturation unit, and logic unit within ALU 960, as shown in FIG. 9. Datapath 210 is shown in detail in FIG. 12. The full 44-bit output is loaded into Acc 910, and either bits [39:20] or bits [19:0] are loaded into result 1210 to be written back to registers or memory. Condition code flags 1220 are generated based on the multiplexed output of the adder, shifter/saturation unit, and logic unit.

Adder

Adder 1230 (referring to FIG. 12) is a 2-input, signed two's complement, 44-bit adder (double-precision with 4-bit headroom) with carry in and carry out. The carry-in input feeds the adder lsb. The carry-out comes out of the 20th bit adder logic (not the 44th bit), and is used for single-precision operations only. Single precision operations are done in the low word (bits [19:0]) of the adder, and generate valid Carry, Zero, Negative, and Overflow condition code flags. Double precision operations are done in full 44 bits, allowing four bits of headroom, and generate valid Zero and Negative condition-code flags only. The adder is part of ALU 960.

Shifter

ALU 960 also includes a 44-bit arithmetic/logical left/right shifter 1240, with zero/one fill for left shift of 1. The shift range is 0–31 bits in both directions. Single-precision shift operations are done in the hi word (bits [39:20]) of the shifter, allowing on-the-fly saturation.

The shifter output has a saturation unit (not shown), allowing shift-scaling and saturation in one operation. Both single and double precision saturation operations are valid. The saturation unit performs 44-bit to 40-bit saturation or limiting function, ensuring that a final result does not exceed a 40-bit (or 20-bit for single precision) dynamic range, thus avoiding overflow.

Logic Unit

A 20-bit (single precision) logic unit 1250 supports all standard bit-wise Boolean operations (AND, OR, XOR, NOT), as well as special functions useful for audio code optimization.

Multiplier

Datapath 210, FIG. 9, also includes a 20-by-20, two's complement (signed×signed) multiplier 940 with one internal pipeline stage (PP). The Product register 950 (P) is the implied destination of all multiply operations.

Address Generation Unit

The address generation unit 240 contains four (expandable to eight) address pointer registers ($ap_0$–$ap_7$), two address increment registers ($ai_0$, $ai_1$), a mask register (amask), a base register (abase), and a mode register (agmode). Each $ap_n$ has an independent adder for address post-modification. One or more of the registers has special functionality such as bit-reversed post-modification, circular buffer control, coefficient-invert logic, sample-invert logic, and address scrambling logic.

Figure 13A:
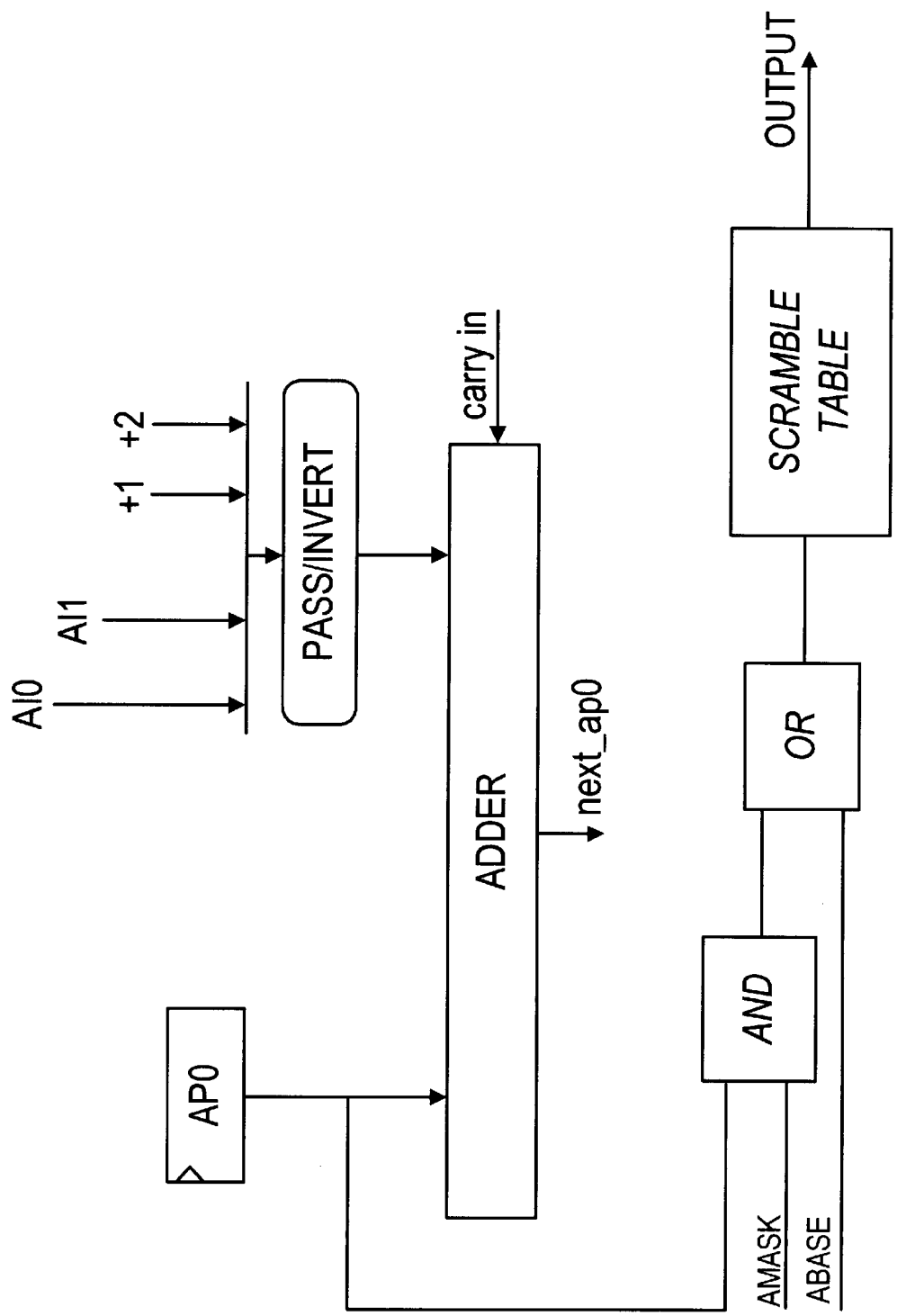
FIGS. 13A through 13C are detailed block diagrams of elements of the Address Generation Unit, according to one embodiment of the present invention.
Figure 13B:
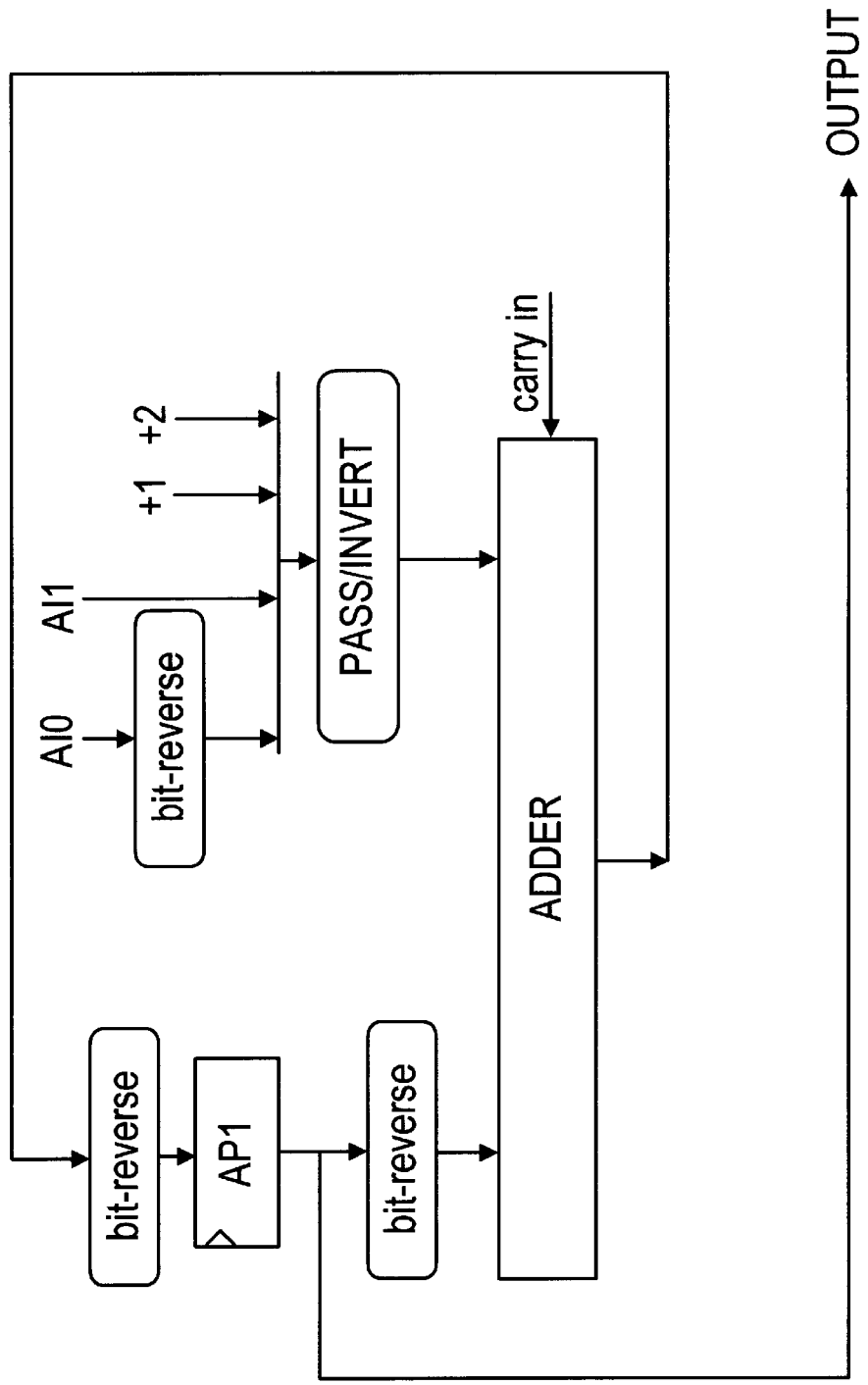
Figure 13C:
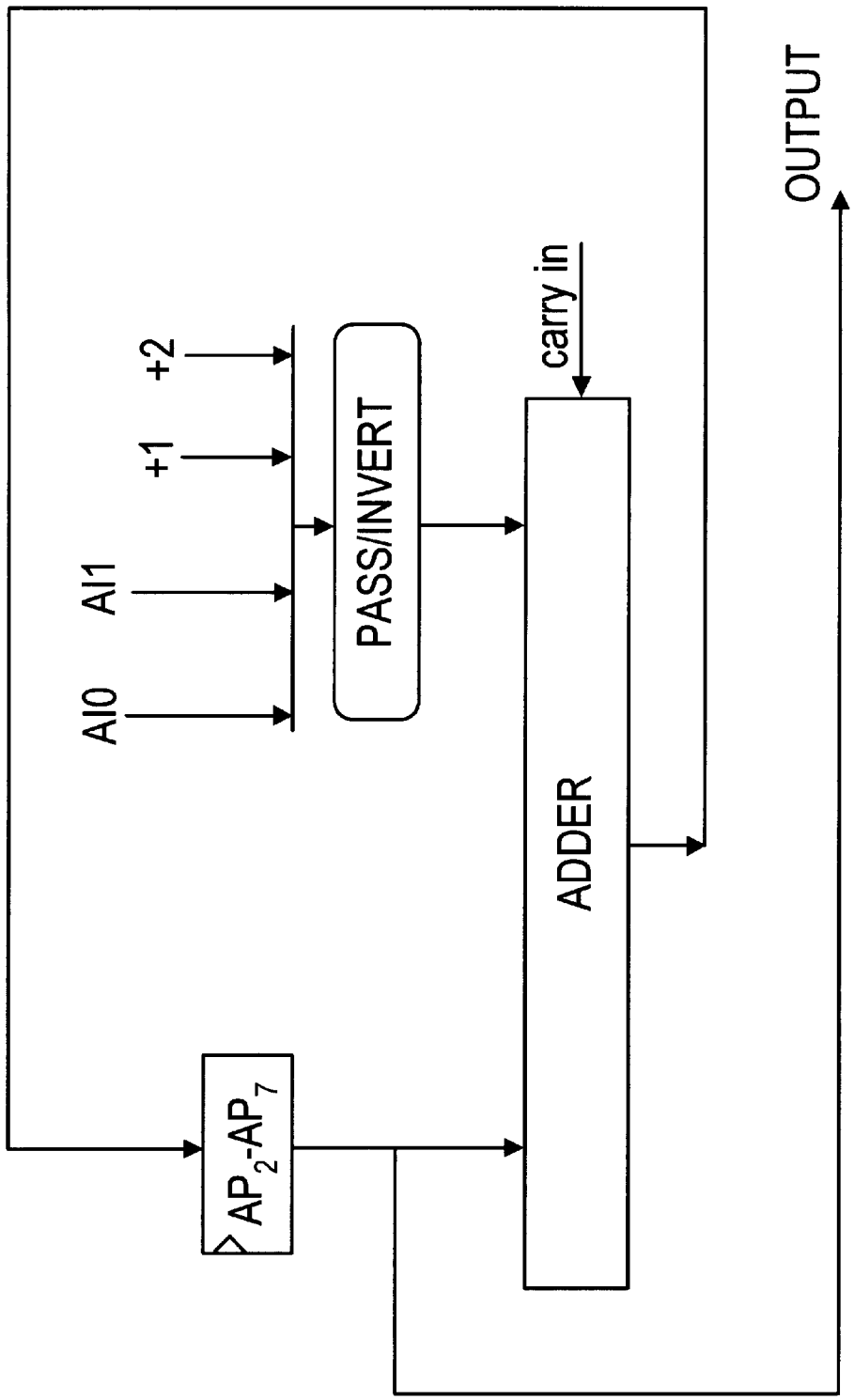

Indirect memory access instructions contain three bits for address pointer selection and three bits for address post-modification mode selection (amode). FIGS. 13A through 13C depict the calculation of address pointers $ap_0$, $ap_1$, and $ap_2$ through $ap_7$ respectively.

For xbyte and xword mode access, the ++ and -- functions modify the address by 1 and 2, respectively. The ++$ai_n$ operation modifies the $ap_n$ by adding the $ai_n$ register to it. This allows implementing an arbitrary stride.

Memory word access address must be word-aligned, i.e. the address must be even. Address arithmetic is done in 13 bits, allowing addressing of up to 8192 10-bit xbytes per memory array.

The circular buffer support is a power of two wrap-around type, with programmable mask (amask) and base (abase) registers, used as follows:

output_address=($ap_n$&amask)|abase

For normal operation, abase must be all zeros, and amask must be all ones (0x1FFF). In addition to circular buffering, the above may be used for base+offset addressing, with some restrictions (non-overlapping base and offset address bits).

Table 22 summarizes the functionality of the address pointers.

TABLE 22

| | STD FUNCTION | CIRCULAR BUFFER | BIT REVERSE | INVERT | SCRAMBLE |
|---|---|---|---|---|---|
| $ap_0$ | yes | YES | no | YES | YES |
| $ap_1$ | yes | no | YES | no | no |
| $ap_2$ | yes | no | no | no | no |
| $ap_3$ | yes | no | no | no | no |

Stack

The stack is an eight-entry, 14-bit hardware stack. It is used for storage of the program return address during subroutine calls only.

Audio Input Buffer

Input buffer 142 is a circular virtual buffer in SDRAM 140, maintained by MMU 130. Audio input buffer 142 is aligned to a 1 Kbyte address boundary and is an integer multiple of 1 Kbytes in size (typically 4 Kbytes).

Audio input buffer 142 contains one of the following types of data: depacketized compressed MPEG audio bitstream, depacketized compressed AC-3 audio bitstream, or depacketized DVD-PCM data.

To read data from this buffer, RISC-DSP audio decoder 160 asserts a memory access request in the 'indirect-read' mode, without specifying an address. The MMU maintains the read address pointer circularly.

Audio Output Buffer

Output buffer 144 is a circular virtual buffer in SDRAM 140, maintained by MMU 130. Audio output buffer 144 is aligned to a 1 Kbyte address boundary, and is an integer multiple of 1 Kbytes in size (typically 3–4 Kbytes per channel).

Audio output buffer 144 always contains 16-bit (or 20-bit) uncompressed PCM audio samples, in one of the following formats:

Stereo (L, R, L, R, . . . )

6-channel surround (L, C, R, Ls, Rs, Lfe)

6-channel surround and stereo downmix (L, C, R, Ls, Rs, Lfe, Ld, Rd)

If more than one channel exists, the channels are interleaved on a sample-by-sample basis according to the order described above.

To write data to this buffer, RISC-DSP audio decoder 160 asserts a memory access request in the 'indirect-write' mode, without specifying an address. The MMU maintains the write address pointer circularly.

Audio Work Buffer

Audio Work Buffer 148 is a general-purpose virtual buffer in SDRAM 140 for private use of RISC-DSP audio decoder 160. It may be used to save and restore data arrays. RISC-DSP audio decoder 160 receives the start address and size of this buffer during soft reset.

To access this buffer, RISC-DSP audio decoder 160 asserts a memory access request in the 'direct' mode, specifying a full 20-bit physical dword address. The current work buffer size required for AC-3 operation is 6 KBytes.

External Downmix Matrix (EDM)

In AC-3 and PCM modes, RISC-DSP audio decoder 160 supports a number of pre-defined output modes, or ways to map n input channels into m output channels. In addition, the output channels may be set to any linear combination of the input channels by specifying an External Downmix Matrix (EDM). Using the EDM, the Host has flexible and complete control over the audio output. In particular, the EDM may be used in Karaoke applications to control the volume level and mixing configuration of each channel.

The Host 190 prepares the EDM and stores it in the external SDRAM 140. A pointer to the EDM is passed to RISC-DSP audio decoder 160 via the command packet, and a parameter indicates whether to use the EDM or the internal pre-defined downmix mode. If EDM use is indicated, RISC-DSP audio decoder 160 will copy the EDM from the external SDRAM into its internal RAM at the beginning of each decode command. If the EDM changes dynamically (as may be the case in Karaoke mode), Host 190 should use a pair of Ping-Pong buffers for the EDM.

The EDM must be dword-aligned in the SDRAM. Each element of the EDM is a 20-bit signed integer packed into a 32-bit dword. The values +1.0 and −1.0 are represented by the values 0x0007FFFF, and 0xFFF80000, respectively.

The EDM has m rows and n columns, where m is the number of output channels, and n is the number of input channels. The low-frequency-effects channel is not included in the EDM.

Legal values of m (output) are, for PCM, 2 and 5 (excluding Lfe). For AC-3, the only legal value of m is 5.

Legal values of n (input) are, for PCM, 1, 2, 3, 4, or 5 (excluding Lfe). For AC-3, the only legal value of n is 5.

The maximum size of the matrix is 5×5, or 25 values. For AC-3 the matrix dimensions must always be 5×5, regardless of the actual number of channels, and the irrelevant entries must be set to 0. The channel ordering within the row (for AC-3 only) must be: L, C, R, Ls, Rs.

The mapping from input to output is done according to the following vector operation:

$$EDM*I=O$$

where EDM is the External Downmix Matrix (size m by n), I is the input vector of size n, and O is the output vector of size m.

Input channel ordering for PCM is channels {0, 1, 2, 3, 4}, as encoded in the audio stream. Input channel ordering for AC-3 is always {L, C, R, Ls, Rs}.

Output channel ordering for both AC-3 and PCM is always {L, C, R, Ls, Rs} for five channel decoding, or {L, R} for two channel PCM only.

For example, a 5×3 EDM for three input channels and five output channels is presented FIG. 10. For the AC-3 case, assume that the three input channels are L, R, S.

In this example, the PCM EDM contains 15 dwords. The coefficient ordering in SDRAM 140 is {$C_{00}$, $C_{01}$, $C_{02}$, $C_{10}$, $C_{11}$, $C_{12}$, $C_{20}$, ...}.

The AC-3 EDM contains 25 dwords. The coefficient ordering in SDRAM 140 is {$C_{00}$, 0, $C_{02}$, $C_{03}$, 0, $C_{10}$, 0, $C_{12}$, $C_{13}$, 0 $C_{20}$, ...}.

Software Implementation

In one embodiment of the present invention, certain precautions must be taken in programming operation of RISC-DSP audio decoder 160.

No Bypass On Mem, MMR Read

The dmem0, dmem1, cmem, and mmr registers have no bypass protection when read into a register, so 2 clock cycles must elapse between loading and reusing a value. Other operations may be done while waiting.

| | | |
|---|---|---|
| ldmw | r0, stat | ; read status reg into r0 |
| nop | | ; wait |
| nop | | ; wait |
| and | test, r0, imm4(1) | ; test the lsb of the status reg. |

Wait After Memory Store

After storing a value to memory, you must wait 2 cycles before reading back the same value. Other operations may be done while waiting.

| | | |
|---|---|---|
| stmw | r0, VAR1, dmem0 | ; store r0 to VAR1 |
| nop | | ; wait |
| nop | | ; wait |
| ldmw | r5, VAR1, dmem0 | ; load VAR1 to r5. |

Wait After MMR Store

After storing a value to a MMR, you must, in most cases, wait 2 cycles before the operation takes effect. In the special case of the STATUS register, you must wait 0 or 1 cycle before using it, as detailed in Table 23 below.

| | | |
|---|---|---|
| | Example for rounding bit: | |
| stmw | r0, STATUS | ; load new rnd value in status |
| nop | | ; wait |
| add | Acc, rnd, p | ; Acc = rnd + p |

TABLE 23

| bits | name | wait cycles | notes |
|---|---|---|---|
| b19: 17 | PAGEC | 1 | used in the 'd' cycle |
| b16: 15 | PAGE1 | | |
| b14: 12 | PAGE0 | | |
| b11: 8 | RND | 1 | used in the 'e' cycle (assumes that one cycle is required for combinational logic propagation delay in addition to the register load pipeline delay) |
| b7 | F1 | 0 | used in the 'e' cycle |
| b6 | SC | 0 | used in the 'e' cycle |
| b5 | F2 | 0 | used in the 'e' cycle |

-continued

| | | | |
|---|---|---|---|
| b4 | | | |
| b3 | C | 0 | used in the 'e' cycle |
| b2 | V | 0 | used in the 'e' cycle |
| b1 | N | 0 | used in the 'e' cycle |
| b0 | Z | 0 | used in the 'e' cycle |

Wait After $ap_n$ Store

After storing a value to $ap_n$, you must wait at least one cycle before using it as indirect address pointer without post-modification:

| | | |
|---|---|---|
| ldsi | ap1, 0x100 | ; load 100 hex into ap1 |
| nop | | ; wait 1 |
| ldmw | r0, *ap1 | ; use ap1 as indirect ptr. |

If post-modification is required, you must wait at least 2 cycles:

| | | |
|---|---|---|
| ldsi | ap1, 0x100 | ; load 100hex into ap1 |
| nop | | ; wait 1 |
| nop | | ; wait 2 |
| ldmw | r0, *ap1++ | ; use ap1 as indirect ptr with post modification. |

Restriction On Delay Slots Of Delayed Branch

Some restrictions apply to instructions placed in the delay slot(s) of delayed branch, jump, call, return:

1. instr cannot be another branch, jump, call, return, etc.
2. instr cannot be srpt, lrpt.
3. instr cannot be a 2-word instr which in not fully contained in the delay slots.

Accumulator, Reg Clear

| | | |
|---|---|---|
| and | Acc, Acc, imm4(0) | ; clear Acc by anding it with 0. |
| and | r2, r2, imm4(0) | ; clear r2 by anding it with 0. |
| ldsi | r0, 0 | ; load short-immediate 0 to r0. |

Negate Accumulator

| | | |
|---|---|---|
| rsub | Acc, Acc, imm4(0) .x1 | ; negate Acc using reverse subtract |

Complement Accumulator

| | | |
|---|---|---|
| rsub | Acc, Acc, imm4(0) .x1 | ; negate Acc using reverse subtract |
| sub | Acc, Acc, imm4(1) .x1 | ; then subtract 1. |

Normalize Accumulator

The following example normalizes the accumulator. The ail register acts as the exponent counter. At the end of the operation, Acc[39:0] contains the normalized mantissa, and ail[5:0] contains the absolute value of the exponent.

| | | |
|---|---|---|
| ldsi ai1, 0 | | ; init exponent count to 0 |
| srpt 39, 0 | | ; normalize 39 times. |
| nop | | |
| cond_norm | | ; if (Acc[39] != Acc[38]) {Acc = Acc << 1; ai1++} |

Absolute Value Register
The following example stores the absolute value of r3 in r0

| | | |
|---|---|---|
| rsub | r0, r3, imm4(0) | ; r0 = −r3 |
| add | test, r3, imm4(0) | ; test r3 |
| cond_add | r0, r3, imm4(0) | ; if (N==0) r0 = r3 |
| nop | | ; wait one cycle before result re-use. |

Min Function
The following example stores min(r2, r3) in r0

| | | |
|---|---|---|
| add | r0, r3, imm4(0) | ; r0 = r3 |
| sub | test, r3, r2 | ; test r3−r2. if N==0, r2<r3. |
| cond_add | r0, r2, imm4(0) | ; if (N==0) r0 = r2 |
| nop | | ; wait one cycle before result re-use. |

Max Function
The following example stores max(r2, r3) in r0

| | | |
|---|---|---|
| add | r0, r2, imm4(0) | ; r0 = r2 |
| sub | test, r3, r2 | ; test r3−r2. if N==0, r2<r3 |
| cond_add | r0, r3, imm4(0) | ; if (N==0) r0 = r3 |
| nop | | ; wait one cycle before result re-use |

No Bypass For COND_ADD, COND_SUB

The first-level register-bypass in case of cond_add, cond_sub does not work. At least one cycle must elapse before result reuse. This affects the previous examples of absolute value and min/max functions.

Fractional Division

In a 20-bit fraction Q19 integer divide operation, both operands must be positive. The divisor must be non zero and larger than the dividend. The divide operation is done as shown below. Upon completion, the division result is in Acc[19:0], and the remainder is in Acc[39:21].

| | | |
|---|---|---|
| | ldli r1, 25800 | ; STEP 1: get dividend in acc.h, acc.l = 0. |
| | add Acc, r1.xh, imm4(0).xh | ; Acc = r1.xh + 0 |
| | ldli r0, 30007 | ; STEP 2: get divisor in r0 |
| | lrpt 20, lp0, 0 | ; STEP 3: execute loop |
| | sub test, Acc, r0.xh | ; test if Acc−r0.xh >= 0 |
| | cond_suba r0 | ; if >= 0, subtract. |
| lp0: | shlf Acc, Acc, imm4(1) | ; shl by 1, with 0 or 1 fill in lsb. ; done. result is in Acc[19:0], remainder in Acc[39:21]. |

Integer Division

In a 20-bit integer divide operation, both operands must be positive. The divisor must be non zero and smaller than the dividend. The divide operation is done as shown below. Upon completion, the division result is in Acc[19:0], and the remainder is in Acc[39:21].

| | | |
|---|---|---|
| | ldli r1, 25800 | ; STEP 1: get (dividend << 1) in acc.l, acc.h = |

-continued

|   |   | 0. |   |
|---|---|---|---|
|   | add Acc, r1.xl, imm4(0).xl | ; Acc = r1.xl + 0 |   |
|   | shl Acc, Acc, imm4(1) | ; Acc = Acc << 1 |   |
|   | ldli r0, 123 | ; STEP 2: get divisor in r0 |   |
|   | lrpt 20, lp1, 0 | ; STEP 3: execute loop 20 times |   |
|   | sub test, Acc, r0.xh | ; test if Acc−r0.xh >= 0 |   |
|   | cond_suba r0 | ; if >= 0, subtract. |   |
| lp1: | shlf Acc, Acc, imm4(1) | ; shl by 1, with 0 or 1 fill in lsb. ; done. result is in Acc[19:0], remainder in Acc[39:21]. |   |

FIFO Read, Bit Extract
The following example reads 5 bits from the FIFO

|   | ldsi r1, 4 | ; r1 = bitcount−1 |
|---|---|---|
|   | stmw r1, bitcnt | ; bitcnt is loaded |
| loop: | brel nvld, loop | ; wait for valid data in FIFO |
|   | ldmw r2, FIFO_lj | ; read 5 bits from FIFO, left aligned. |

If the FIFO is known to have valid data, one clock cycle must elapse between loading the bitcnt register and reading the FIFO data:

| loop2: | brel nvld, loop2 | ; wait for valid data in FIFO |
|---|---|---|
|   | ldsi r1, 4 | ; r1 = bitcount−1 |
|   | stmw r1, bitcnt | ; bitcnt is loaded |
|   | nop | ; wait one cycle for bitcnt to take effect. |
|   | ldmw r2, FIFO_lj | ; read 5 bits from FIFO, left aligned. |

Vector Processing: VMACC, VMACCN

The following example performs an 8-tap filter. Samples are in 'samp' array in dmem0, coefficients are in 'fir8' array in cmem, and the output sample is stored in 'out' variable in dmem0. Note that, due to the pipeline depth, 4 extra vmacc cycles are required. The first 4 vmacc cycles prime the pipeline, and the actual operation starts on the 5th vmacc. To avoid accumulating invalid data during the first 4 cycles, vpe_ctl is set to 1 in the srpt instruction. This activates a state machine that forces the operation Acc = rnd + p
instead of the operation
Acc = Acc + p
in the 5th cycle of the repeated instruction.
;
; - - - Initialization
;

|   | ldsi abase, 0, us | ; init abase & amask for normal operation of ap0. |
|---|---|---|
|   | ldsi amask, 0x1fff, s |   |

;
; - - - Set rnd in status register
;

|   | ldli r0, 0x0700 | ; set rnd to std mpy mode. |
|---|---|---|
|   | stmw r0, status |   |

;
; - - - init agmode for VPE: select dmem0 for op0,
; cmem for op1.
;

|   | ldsi agmode, 0x20, us | ; src0=dmem0, src1=cmem, dest=dmem0 |
|---|---|---|

;
; - - - init other address pointers
;

|   | ldsi ap0, samp, us | ; ap0 points to samples in dmem0 |
|---|---|---|
|   | ldsi ap1, fir8, us | ; ap1 points to coefficients in cmem |
|   | ldsi ap2, out, us | ; ap2 points to output. |

;
; - - - do the filter
;

|   | srpt 12, 1 | ; repeat 12 times, (8+4), set vpe_ctl to 1 for rnd in 5th cycle. |
|---|---|---|
|   | nop |   |
|   | vmacc *ap0++, *ap1++ | ; repeat 12 times, the first 4 times prime the pipeline. |
|   | shl r1, Acc, imm4(1), sat | ; scale by 2, saturate and store in r1. |
|   | stmw r1, *ap2++, dmem0 | ; save result in memory. |

Vector Processing: VACC, VACCN

The following example performs an 8-vector addition. Samples are in 'samp' array in dmem0, and the result is stored in 'out' variable in dmem0. Note that, due to the pipeline depth, 2 extra vacc cycles are required. The first 2 vacc cycles prime the pipeline, and the actual operation starts on the 3rd vacc. To avoid accumulating invalid data during the first 2 cycles, vpe_ctl is set to 2 in the srpt instruction. This activates a state machine that forces the operation Acc = rnd + op1
instead of the operation
Acc = Acc + op1
in the 3rd cycle of the repeated instruction.
;
; - - - Initialization
;

|   | ldsi abase, 0, us | ; init abase & amask for normal operation of ap0. |
|---|---|---|
|   | ldsi amask, 0x1fff, s |   |

;
; - - - Set rnd in status register
;

|   | ldsi r0, 0 | ; set rnd to 0. |
|---|---|---|
|   | stmw r0, status |   |

;
; - - - init agmode for VPE: select dmem0 for op0,
; cmem for op1.
;

|   | ldsi agmode, 0x20, us | ; src0=dmem0, src1=cmem |
|---|---|---|

;
; - - - init other address pointers
;

|   | ldsi ap0, samp, us | ; ap0 points to samples in dmem0 |
|---|---|---|
|   | ldsi ap2, out, us | ; ap2 points to output. |

;
; - - - do the sum
;

|   | srpt 10, 2 | ; repeat 10 times, (8+2), set vpe_ctl to 2 for rnd in 3rd cycle. |
|---|---|---|
|   | nop |   |
|   | vacc *ap0++ | ; repeat 10 times, the first 2 times prime the pipeline. |

-continued

| | |
|---|---|
| shl r1, acc, imm4(0), sat | ; scale by 1, saturate and store in r1. |
| stmw r1, *ap2++, dmem0 | ; save result in memory. |

Vector Processing: VXFER, VXFERN

The following example performs an 8-vector transfer from dmem1 to dmem0. Note that, due to the pipeline depth, 2 extra vxfer cycles are required. The first 2 vxfer cycles prime the pipeline, and the actual operation starts on the 3rd vxfer. To avoid writing invalid data during the first 2 cycles, vpe_ctl is set to 3 in the srpt instruction. This activates a state machine that disables the first two write operations. The write pointer, however, is modified in the first two cycles as well, so its initial value should be 2 words before the start of the destination buffer.

| | |
|---|---|
| ; | |
| ; - - - Initialization | |
| ; | |
| ldsi abase, 0, us | ; init abase & amask for normal operation of ap0. |
| ldsi amask, 0x1fff, s | |
| ; | |
| ; - - - Init Acc to 0 | |
| ; | |
| ldsi r0, 0 | ; set Acc to 0. |
| add Acc, r0.xh, imm4(0).xh | |
| ; | |
| ; - - - init agmode for VPE: select dmem0 for op0, | |
| ; cmem for op1. | |
| ; | |
| ldsi agmode, 0x10, us | ; src0/dest=dmem0, src1=dmem1 |
| ; | |
| ; - - - init other address pointers | |
| ; | |
| ldsi ap0, src_buf, us | ; ap0 points to source buffer in dmem1 |
| ldsi ap2, dest_buf − 4, us | ; ap2 points to output minus 2 words. |
| ; | |
| ; - - - do the xfer | |
| ; | |
| srpt 10, 3 | ; repeat 10 times (8+2), set vpe_ctl to 3. |
| nop | |
| vxfer *ap2++, *ap0++ | ; repeat 10 times, the first 2 times prime the pipeline. |

I claim:

1. A processor comprising:
a bus;
a register file coupled to said bus;
a memory coupled to said bus comprising at least a first, a second, and a third memory space, wherein said first memory space stores one or more program instructions, said second memory space stores signal processing coefficients, and said third memory space stores dynamic data values received from an input bitstream, wherein said third memory space comprises at least a FIFO buffer having bit extract circuitry, wherein said bit extract circuitry extracts from said input bitstream zero or more bits at a time;
an address generation unit coupled to said bus; and
a datapath coupled to said bus, the datapath comprising an adder, a shifter, a saturation unit coupled to said shifter, a logic unit, an accumulator, and a multiplier;
wherein said program instructions include at least a multiply-accumulate (MAC) instruction; and
wherein said program instructions are read from said first memory space over said bus using said address generation unit in response to an edge of a clock signal; and
wherein said MAC instruction is executed by said register file and said datapath in a pipelined stream having an execution throughput of one program instruction per cycle of said clock.

2. The processor of claim 1 wherein said dynamic data values are loaded directly into said datapath from either said third memory space or said register file.

3. The processor of claim 1 wherein said first, second, or said first and second memory spaces further comprise a ROM.

4. The processor of claim 1 wherein said third memory space further comprises a RAM.

5. A method of operating a computer system to decode input signals, the computer system comprising a bus, a register file, a first, a second, a third and a fourth memory space, a processor, a datapath, and an address generation unit all coupled to said bus, the method comprising:

(a) executing a program on the processor, the program comprising at least a multiply accumulate (MAC) instruction, wherein said program is stored in said first memory space;

(b) timing execution of said MAC instruction in response to an edge of a clock signal;

(c) buffering an input datastream in said fourth memory space;

(d) issuing said MAC instruction to said datapath in a pipelined ordering, wherein said pipelined ordering has a steady state throughput of one MAC instruction per cycle of said clock and wherein said pipelined ordering utilizes said address generation unit to expedite execution;

(e) executing said MAC instruction in said datapath, wherein said datapath communicates over said bus with said second, third, and fourth memory spaces, said second memory space stores signal processing coefficients, said third memory space stores dynamic data values received from an input bitstream;

(f) said register file and said second, third, and fourth memory spaces and said datapath further processing the results of said MAC instruction; and (g) updating the contents of said third and fourth memory spaces;

wherein said third memory space comprises at least a FIFO buffer having bit extract circuitry, wherein said execution of said program includes extracting from said input bitstream using said bit extract circuitry zero or more bits at a time.

6. The method of claim 5 wherein said dynamic data values are loaded directly into said datapath from either said third memory space or said register file.

7. The method of claim 5 wherein said first, second, or first and second memory spaces further comprise a ROM.

8. The method of claim 5 wherein said third, fourth, or third and fourth memory spaces further comprise RAM.

9. A computer system comprising:
bus means for communicating data and instructions among elements of said computer system;
register file means coupled to said bus means for caching dynamic data;
memory means of a first, a second, a third, and a fourth type coupled to said bus means; said first type memory means storing program instructions, said second type memory means storing signal processing coefficients, said third and fourth type memory means storing dynamic data, wherein said third type memory means comprises at least a FIFO buffer having bit extract circuitry, wherein said processor means may extract zero or more bits at a time from said input bitstream using said bit extract circuitry;

address generation means coupled to said bus means for computing relative addresses;

datapath means coupled to said bus means for executing said program instructions, said program instructions comprising at least a multiply accumulate (MAC) instruction;

processor means coupled to said bus means for executing said program instructions;

wherein said program instructions are read from said first type memory means over said bus means using said address generation means in response to an edge of a clock means; and wherein said MAC instructions are executed by said register file means and said datapath means in a pipelined stream, said pipelined stream resulting in a throughput of one program instruction per cycle of said clock means; and wherein an input bitstream is buffered in said fourth type memory means before being transferred to said third type memory means via said bus means.

10. The computer system of claim 9 wherein said datapath means receives input directly from either said register file means or said third type memory means.

11. The computer system of claim 9 wherein said first, second, or first and second type memory means further comprise a ROM.

12. The computer system of claim 9 wherein said third, fourth, or third and fourth type memory means further comprise a RAM.

* * * * *